(12) United States Patent
Huang et al.

(10) Patent No.: US 10,541,793 B2
(45) Date of Patent: Jan. 21, 2020

(54) METHOD AND APPARATUS OF MITIGATING INTERFERENCE IN A HETEROGENEOUS NETWORK USING AN INTER-CELL INTERFERENCE COORDINATION

(71) Applicant: INDUSTRIAL TECHNOLOGY RESEARCH INSTITUTE, Zhudong Township, Hsinchu County (TW)

(72) Inventors: Jen-Feng Huang, Kaohsiung (TW); Ching-Feng Liang, Hsinchu (TW); You-En Lin, Taichung (TW)

(73) Assignee: INDUSTRIAL TECHNOLOGY RESEARCH INSTITUTE, Zhudong Township (TW)

( * ) Notice: Subject to any disclaimer, the term of this patent is extended or adjusted under 35 U.S.C. 154(b) by 89 days.

(21) Appl. No.: 15/379,113

(22) Filed: Dec. 14, 2016

(65) Prior Publication Data

US 2018/0167179 A1  Jun. 14, 2018

(51) Int. Cl.
*H04L 5/00* (2006.01)
*H04W 16/14* (2009.01)
*H04W 72/08* (2009.01)
*H04W 72/04* (2009.01)
*H04W 84/04* (2009.01)
(Continued)

(52) U.S. Cl.
CPC ........... *H04L 5/0032* (2013.01); *H04W 16/14* (2013.01); *H04W 72/048* (2013.01); *H04W 72/082* (2013.01); *H04W 8/186* (2013.01); *H04W 16/32* (2013.01); *H04W 28/16* (2013.01); *H04W 84/045* (2013.01)

(58) Field of Classification Search
CPC .. H04L 5/0032; H04W 16/14; H04W 72/0446
See application file for complete search history.

(56) References Cited

U.S. PATENT DOCUMENTS 8,804,561 B2   8/2014  Kazmi et al.
9,060,377 B2   6/2015  Gao et al.
(Continued)

FOREIGN PATENT DOCUMENTS

CN   105282787 A   1/2016
EP    2563083 A1   2/2013
(Continued)

OTHER PUBLICATIONS

Extended European Search Report dated Dec. 11, 2017, for European Application No. 16206962.9.
(Continued)

*Primary Examiner* — Jael M Ulysse
(74) *Attorney, Agent, or Firm* — Birch, Stewart, Kolasch & Birch, LLP

(57) ABSTRACT

Methods and apparatuses of mitigating interference in a heterogeneous network using an inter-cell interference coordination are provided. An interference control server assigns, for each of the UE groups, a set of almost blank subframes (ABS) or non-preferred sub-bands specific to the corresponding one of the UE groups based on the UE group interference relationship and a resource demand for each of the UE groups. A base station assigns a plurality of sets of ABS (or non-preferred sub-bands) to reuse time-domain (or frequency-domain) resources.

30 Claims, 28 Drawing Sheets

(51) Int. Cl.
*H04W 8/18* (2009.01)
*H04W 28/16* (2009.01)
*H04W 16/32* (2009.01)

(56) References Cited

U.S. PATENT DOCUMENTS

| | | | |
|---|---|---|---|
| 9,078,255 B2 | 7/2015 | Pang et al. | |
| 9,161,319 B2 | 10/2015 | Cheng et al. | |
| 9,264,204 B2 | 2/2016 | Seo et al. | |
| 9,337,971 B2 | 5/2016 | Takano | |
| 2012/0082052 A1* | 4/2012 | Oteri | H04W 24/10 370/252 |
| 2012/0207025 A1* | 8/2012 | Barbieri | H04L 1/20 370/236 |
| 2013/0114529 A1* | 5/2013 | Chen | H04L 1/1812 370/329 |
| 2013/0115999 A1* | 5/2013 | Sirotkin | H04B 7/0617 455/522 |
| 2013/0163529 A1* | 6/2013 | Chen | H04W 72/082 370/329 |
| 2013/0281089 A1* | 10/2013 | Chandrasekhar | H04W 24/02 455/434 |
| 2013/0315115 A1* | 11/2013 | Kim | H04J 11/0056 370/280 |
| 2014/0211734 A1* | 7/2014 | Seo | H04J 11/0056 370/329 |
| 2015/0029890 A1* | 1/2015 | Siomina | H04L 1/1854 370/252 |
| 2015/0139134 A1* | 5/2015 | Dinan | H04W 52/346 370/329 |
| 2015/0146659 A1* | 5/2015 | Dinan | H04W 72/0446 370/329 |
| 2015/0181641 A1* | 6/2015 | Farajidana | H04W 52/0216 370/311 |
| 2015/0249530 A1* | 9/2015 | Zhang | H04L 5/0058 370/329 |
| 2015/0257164 A1* | 9/2015 | Lim | H04L 5/0073 370/252 |
| 2015/0365957 A1* | 12/2015 | Zhu | H04W 24/04 370/280 |
| 2016/0211955 A1* | 7/2016 | Wu | H04W 24/02 |
| 2016/0212629 A1* | 7/2016 | Wei | H04W 36/0085 |
| 2016/0316484 A1* | 10/2016 | Feng | H04L 1/00 |
| 2017/0099670 A1* | 4/2017 | Bhattacharya | H04L 43/16 |
| 2017/0346609 A1* | 11/2017 | Li | H04W 72/10 |

FOREIGN PATENT DOCUMENTS

| | | |
|---|---|---|
| EP | 2816832 A1 | 12/2014 |
| TW | I492855 B | 7/2015 |
| WO | WO 2013/080159 A1 | 6/2013 |
| WO | WO 2014/110762 A1 | 7/2014 |

OTHER PUBLICATIONS

Alfarhan et al., "An Optimization Framework for LTE eICIC and Reduced Power eICIC", in IEEE Globecom, 2015, 6 Pages.
Bedekar et al., "Optimal Muting and Load Balancing for eICIC", in WiOpt, May 13-17, 2013, pp. 280-287.
Jiang et al., "Improved MPSO Based eICIC Algorithm for LTE-A Ultra Dense HetNets", in IEEE Globecom, 2014, pp. 3678-3683.
Jiang et al., "Resource Allocation for eICIC Scheme in Heterogeneous Networks", in IEEE PIMRC, 2012, pp. 448-453.
Son et al., "Dynamic Association for Load Balancing and Interference Avoidance in Multi-Cell Networks", IEEE Transactions on Wireless Communications, vol. 8, No. 7, Jul. 2009, pp. 3566-3576.
Soret et al., "Centralized and Distributed Solutions for Fast Muting Adaptation in LTE-Advanced HetNets", IEEE Transactions on Vehicular Technology, vol. 64, No. 1, Jan. 2015, pp. 147-158.
Tang et al., "Joint Resource Allocation for eICIC in Heterogeneous Networks", in IEEE Globecom, 2014, pp. 2011-2016.
Vasudevan et al., "Dynamic eICIC—A Proactive Strategy for Improving Spectral Efficiencies of Heterogeneous LTE Cellular Networks by Leveraging User Mobility and Traffic Dynamics", IEEE Transactions on Wireless Communications, vol. 12, No. 10, Oct. 2013, pp. 4956-4969.
Wang et al., "Reduced Power Centralized eICIC for LTE—Advanced Heterogeneous Networks", IEEE/CIC ICCC 2014, pp. 743-747.
Taiwanese Office Action and Search Report for Taiwanese Application No. 105142268, dated Oct. 27, 2017.

\* cited by examiner

For each of the UE groups, assign a second set of frequency-specific sub-bands within the frequency band to the corresponding one of the UE groups as a set of preferred downlink sub-bands of the corresponding one of the UE groups — S2161

For each of the UE groups, assign a rest of the sub-bands within the frequency band that are not part of the set of preferred downlink sub-bands as the set of non-preferred downlink sub-bands of the corresponding one of the UE groups — S2162

FIG. 21B

METHOD AND APPARATUS OF MITIGATING INTERFERENCE IN A HETEROGENEOUS NETWORK USING AN INTER-CELL INTERFERENCE COORDINATION

TECHNICAL FIELD

The present application relates to methods and apparatuses of mitigating interference, and more particularly to methods and apparatuses of mitigating interference in a heterogeneous network using an inter-cell interference coordination.

BACKGROUND

In recent years, mobile broadband traffic has grown exponentially over the past years, thanks to the new generation of mobile terminals, such as smartphones, tablets and laptops. On the other hand, the consumers' demand and expectations of a consistent, high-quality and seamless mobile broadband experience are on the rise. Therefore, the capacity and the coverage of the current networks need to be improved to deliver high data throughput with very low latency to meet the consumers' expectations. Since spectrum has become a scarce resource nowadays, the deployment of heterogeneous networks, i.e., improving and densifying the existing macro cells (base stations) and complementing the macro cells with small cells, has been proposed to optimize the network performance.

FIG. 1 illustrates an example of a heterogeneous network. A heterogeneous network is composed of multiple radio access technologies, architectures, transmission solutions, and base stations of varying transmission power that can interoperate, thus creating a multilayer structure. Due to the different operating modes of the cells, and the unbalanced transmission power of the different base stations of the network, selecting the appropriate sever station can be challenging for the users equipments (UEs). Managing the interferences caused by the macro cell to the small cells and vice versa is one of the biggest challenges in the deployment of heterogeneous networks. Some Inter Cell Interference Coordination (ICIC) schemes, such as Enhanced Inter Cell Interference Coordination (eICIC) schemes, have been proposed to deal with this problem. These approaches can be divided into time domain techniques, such as almost blank subframes (ABS), and frequency domain techniques.

FIG. 2 illustrates an example of how a conventional interference control in the EICIC schemes is implemented. For example, in the eICIC schemes, a conventional interference control between a macro cell (e.g., $eNB_2$) and a small cell (e.g., $eNB_1$) is implemented by assigning a set of ABS (i.e., Subframes #4 and 5) to the macro cell, as illustrated in FIG. 2. The macro cell $eNB_2$ will not transmit data in this set of ABS, such that the data transmission between the small cell $eNB_1$ and the edge UEs can be done using this set of ABS, thereby mitigating interference from the macro cell to the edge UEs.

However, since the deployment of the small cells is usually irregularly and/or unevenly distributed, although the above conventional interference control may mitigate interference to the edge UEs served by the small cell from the other small cells in the heterogeneous network, the conventional schemes would waste precious time domain resources. For example, FIG. 3 illustrates the interference among the small cells $eNB_1$, $eNB_2$ and $eNB_3$. As shown in FIG. 3, the small cell $eNB_1$ serves the $UE_1$, the small cell $eNB_2$ serves the $UE_2$ and $UE_3$, and the small cell $eNB_3$ serves the $UE_4$ and $UE_5$. Although the above-mentioned interference control assigning a uniform set of ABS (i.e., Subframes #4 and 5 as shown in the example of FIG. 3) to the $eNB_1$ and $eNB_3$ may mitigate interference to the $UE_2$ and $UE_3$ (served by $eNB_2$) from the small cells $eNB_1$ and $eNB_3$, it would not use time domain resource efficiently. As shown in FIG. 3, although the small cell $eNB_2$ may transmit data to $UE_2$ and $UE_3$ in Subframes #4 and 5, respectively, since the $UE_2$ is not within the communication coverage range of the small cell $eNB_3$, even if the small cell $eNB_2$ transmits data to the $UE_2$ during the ABS (i.e., Subframe #4), the collision will not occur. Therefore, the small cell $eNB_2$ only needs to set Subframe #5 as ABS to $eNB_3$. More precisely, the small cell $eNB_3$ can transmit data on Subframe #4 so that time domain resource (i.e., Subframe #4) can be reused. Similarly, the small cell $eNB_2$ only needs to set Subframe #4 as ABS to $eNB_1$ as ABS to the small cell $eNB_1$ so that Subframe #5 can be reused. In view of the above, it is clear that precious time domain resources will be wasted in the conventional schemes because unnecessary ABS may be assigned to the cells.

SUMMARY

Accordingly, it is an object of the present application to provide methods and apparatuses of mitigating interference among the base stations in a heterogeneous network using an inter-cell interference coordination.

To achieve the above-mentioned object, according to a first aspect of the present application, a time-domain method of mitigating interference in a heterogeneous network using an inter-cell interference coordination is provided, wherein the heterogeneous network comprises a plurality of base stations, communication ranges of at least some of the base stations overlap, and a plurality of user equipments (UEs) are within the communication ranges of the base stations. The method comprises: identifying, by an interference control server, an interference-service relationship between any one of the base stations and any one of the UEs, wherein the interference-service relationship indicates whether any one of the UEs is severed by or interfered from any one of the base stations; grouping, by the interference control server, the UEs into a plurality of UE groups, wherein each UE in a same UE group has an identical interference-service relationship with all of the base stations; identifying, by the interference control server, an UE group interference relationship among the UE groups, wherein the UE group interference relationship indicates which ones of the UE groups may result in collision if simultaneously receiving downlink data in a same downlink subframe within a period; and for each of the UE groups, assigning, by the interference control server, a first set of time-specific downlink subframes within the period to a corresponding one of the UE groups as a set of almost blank subframes (ABS) specific to the corresponding one of the UE groups based on the UE group interference relationship and a resource demand for each of the UE groups.

Furthermore, according to a second aspect of the present application, an interference control server for mitigating interference in a heterogeneous network using a time-domain inter-cell interference coordination is provided, wherein the heterogeneous network comprises a plurality of base stations, communication ranges of at least some of the base stations overlap, and a plurality of user equipments (UEs) are within the communication ranges of the base stations. The interference control server comprises: a receiver configured to receive interference-service information of each of the UEs from the base stations; a processor connected to the receiver and configured to identify an interference-service relationship between any one of the base stations and any one of the UEs based on the interference-service information received by the receiver, wherein the interference-service relationship indicates whether any one of the UEs is severed by or interfered from any one of the base stations; group the UEs into a plurality of UE groups, wherein each UE in a same UE group has an identical interference-service relationship with all of the base stations; identify an UE group interference relationship among the UE groups, wherein the UE group interference relationship indicates which ones of the UE groups may result in collision if simultaneously receiving downlink data in a same downlink subframe within a period; and for each of the UE groups, assign a first set of time-specific downlink subframes within the period to a corresponding one of the UE groups as a set of almost blank subframes (ABS) specific to the corresponding one of the UE groups based on the UE group interference relationship and a resource demand for each of the UE groups.

Still furthermore, according to a third aspect of the present application, a frequency-domain method of mitigating interference in a heterogeneous network using an inter-cell interference coordination is provided, wherein the heterogeneous network comprises a plurality of base stations, communication ranges of at least some of the base stations overlap, and a plurality of user equipments (UEs) are within the communication ranges of the base stations. The method comprises: identifying, by an interference control server, an interference-service relationship between any one of the base stations and any one of the UEs, wherein the interference-service relationship indicates whether any one of the UEs is severed by or interfered from any one of the base stations; grouping, by the interference control server, the UEs into a plurality of UE groups, wherein each UE in a same UE group has an identical interference-service relationship with all of the base stations; identifying, by the interference control server, an UE group interference relationship among the UE groups, wherein the UE group interference relationship indicates which ones of the UE groups would result in collision if simultaneously receiving downlink data in a same sub-band within a frequency band; and for each of the UE groups, assigning, by the interference control server, a first set of frequency-specific sub-bands within the frequency band to a corresponding one of the UE groups as a set of non-preferred downlink sub-bands specific to the corresponding one of the UE groups based on the UE group interference relationship and a resource demand for each of the UE groups.

Still furthermore, according to a fourth aspect of the present application, an interference control server for mitigating interference in a heterogeneous network using a frequency-domain inter-cell interference coordination, wherein the heterogeneous network comprises a plurality of base stations, communication ranges of at least some of the base stations overlap, and a plurality of user equipments (UEs) are within the communication ranges of the base stations. The interference control server comprises: a receiver configured to receive interference-service information of each of the UEs from the base stations; a processor connected to the receiver and configured to identify an UE group interference relationship among the UE groups, wherein the UE group interference relationship indicates which ones of the UE groups would result in collision if simultaneously receiving downlink data in a same sub-band within a frequency band; and for each of the UE groups, assign a first set of frequency-specific sub-bands within the frequency band to a corresponding one of the UE groups as a set of non-preferred downlink sub-bands specific to the corresponding one of the UE groups based on the UE group interference relationship and a resource demand for each of the UE groups.

Still furthermore, according to a fifth aspect of the present application, a method of mitigating interference in a heterogeneous network using an inter-cell interference coordination is provided, wherein the heterogeneous network comprises a plurality of base stations, communication ranges of at least some of the base stations overlap, and a plurality of user equipments (UEs) are within the communication ranges of the base stations. The method comprises: receiving, by one of the base stations, a plurality of sets of almost blank subframes (ABS) from an interference control server, wherein each one of the plurality of sets of ABS is different from one another, at least two UE groups within the plurality of the UEs are currently served by the one of the base stations, and each of the at least two UE groups consists of a corresponding one or more UEs of the plurality of the UEs; and assigning, by the one of the base stations, one of the plurality of sets of ABS to one of the at least two UE groups, and another one of the plurality of sets of ABS to another one of the at least two UE groups.

Still furthermore, according to a sixth aspect of the present application, a method of mitigating interference in a heterogeneous network using an inter-cell interference coordination is provided, wherein the heterogeneous network comprises a plurality of base stations, communication ranges of at least some of the base stations overlap, and a plurality of user equipments (UEs) are within the communication ranges of the base stations. The method comprises: receiving, by one of the base stations, a plurality of sets of non-preferred downlink sub-bands from an interference control server, wherein each one of the plurality of sets of non-preferred downlink sub-bands is different from one another, at least two UE groups within the plurality of the UEs are currently served by the one of the base stations, and each of the at least two UE groups consists of a corresponding one or more UEs of the plurality of the UEs; and assigning, by the one of the base stations, one of the plurality of sets of non-preferred downlink sub-bands to one of the at least two UE groups, and another one of the plurality of sets of non-preferred downlink sub-bands to another one of the at least two UE groups.

Further scope of applicability of the present application will become apparent from the detailed description given hereinafter. However, it should be understood that the detailed description and specific examples, while indicating preferred embodiments of the application, are given by way of illustration only, since various changes and modifications within the spirit and scope of the invention will become apparent to those skilled in the art from this detailed description.

BRIEF DESCRIPTION OF THE DRAWINGS

The present application will become more fully understood from the detailed description given hereinbelow and the accompanying drawings which are given by way of illustration only, and thus are not limitative of the present application, and wherein:

FIGS. 21A-21C illustrate method of mitigating interference in a heterogeneous network using an inter-cell interference coordination in the frequency domain in accordance with several embodiments of the present application;

DETAILED DESCRIPTION OF THE ILLUSTRATED EMBODIMENTS

Figure 1:
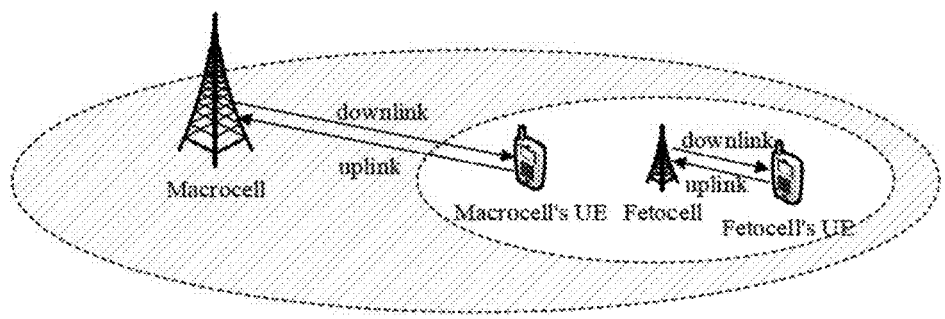
FIG. 1 illustrates an example of a heterogeneous network.
Figure 2:
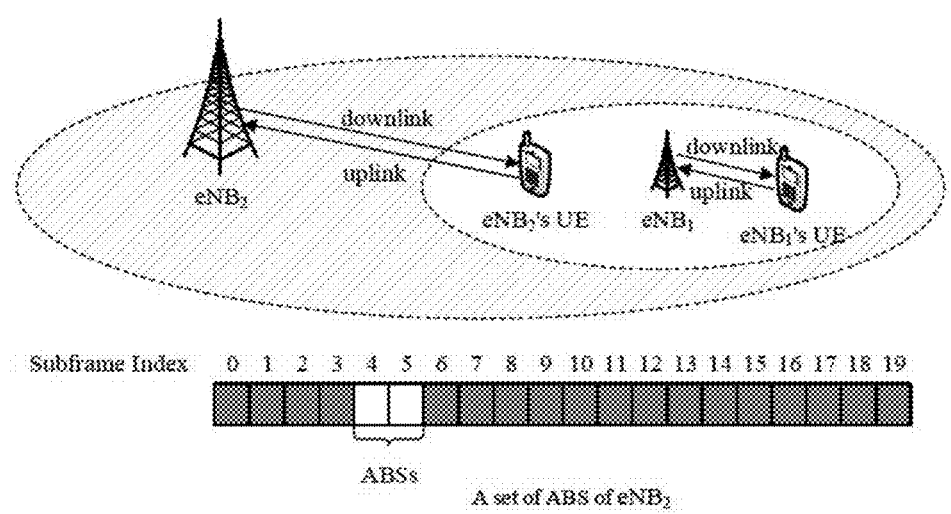
FIG. 2 illustrates an example of how an interference control in the eICIC schemes is implemented.
Figure 3:
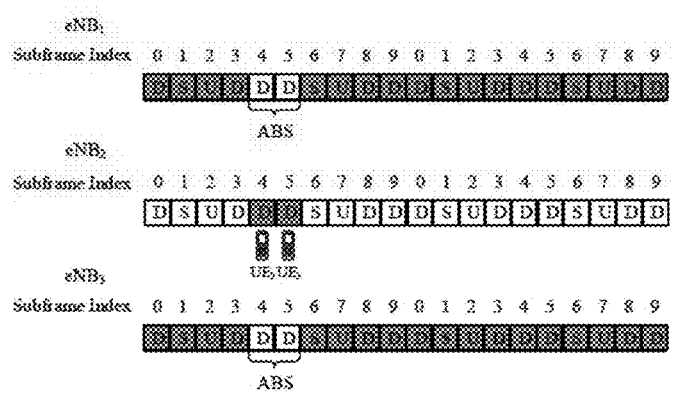
FIG. 3 illustrates an example of the interference among small cells in a heterogeneous network.
Figure 3:
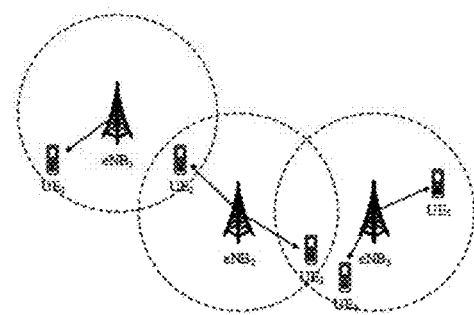

The present application will now be described in detail with reference to the accompanying drawings, wherein the same reference numerals will be used to identify the same or similar elements throughout the several views. It should be noted that the drawings should be viewed in the direction of orientation of the reference numerals.

Figure 4:
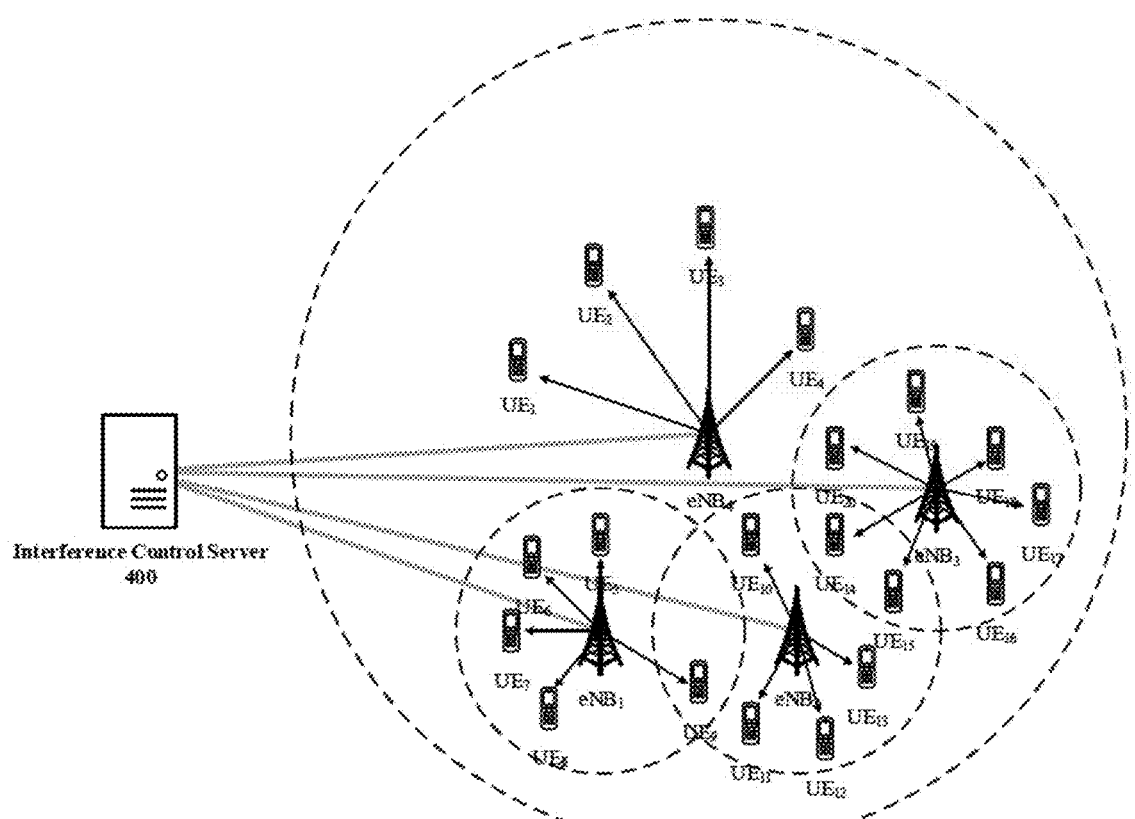
FIG. 4 illustrates a heterogeneous network with an interference control server for mitigating interference in the heterogeneous network using an inter-cell interference coordination in accordance with an embodiment of the present application.

FIG. 4 illustrates a heterogeneous network with an interference control server for mitigating interference in the heterogeneous network using an inter-cell interference coordination in accordance with an embodiment of the present application.

As shown in FIG. 4, the heterogeneous network comprises a plurality of base stations such as $eNB_1$-$eNB_4$. In addition, the communication ranges (represented by the dash circles around the base stations) of at least some of the base stations $eNB_1$-$eNB_4$ overlap. For example, the communication range of the macro base station $eNB_4$ overlaps with each of the communication range of the small base stations $eNB_1$, $eNB_2$, $eNB_3$; the communication range of the small base station $eNB_3$ further overlaps with the communication range of the small base station $eNB_2$; and the communication range of the small base station $eNB_2$ further overlaps with the communication range of the small base station $eNB_1$). Also, a plurality of user equipments (UEs) such as $UE_1$-$UE_{20}$ are within the communication ranges of the base stations $eNB_1$-$eNB_4$ as shown in FIG. 4.

Figure 5A:
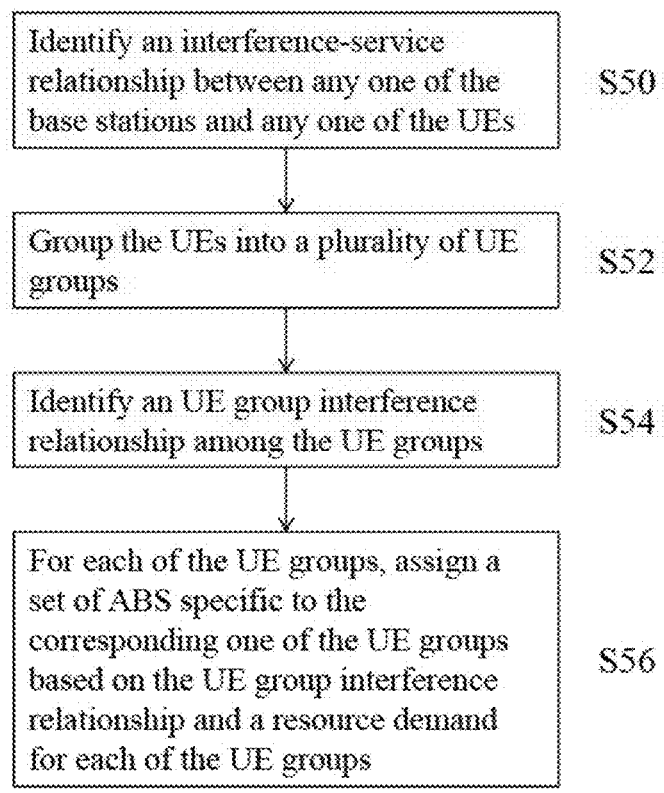
FIGS. 5A-5C illustrate method of mitigating interference in a heterogeneous network using an inter-cell interference coordination in the time domain in accordance with several embodiments of the present application.
Figure 5B:
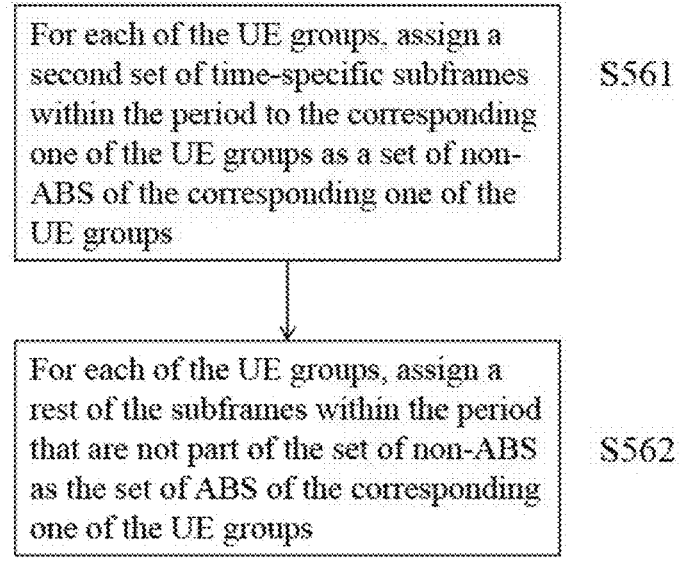
Figure 5C:
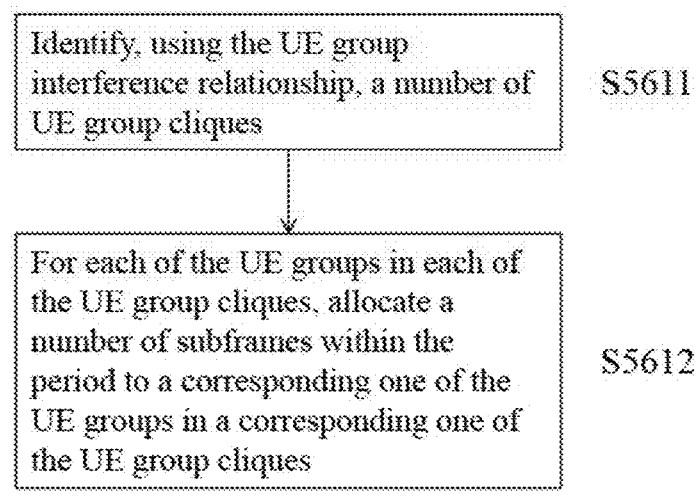

FIGS. 5A-5C illustrate method of mitigating interference in a heterogeneous network using an inter-cell interference coordination in the time domain in accordance with several embodiments of the present application.

In particular, the interference control server identifies an interference-service relationship between any one of the base stations and any one of the UEs (Step S50), wherein the interference-service relationship indicates whether any one of the UEs is severed by or interfered from any one of the base stations.

Figure 6:
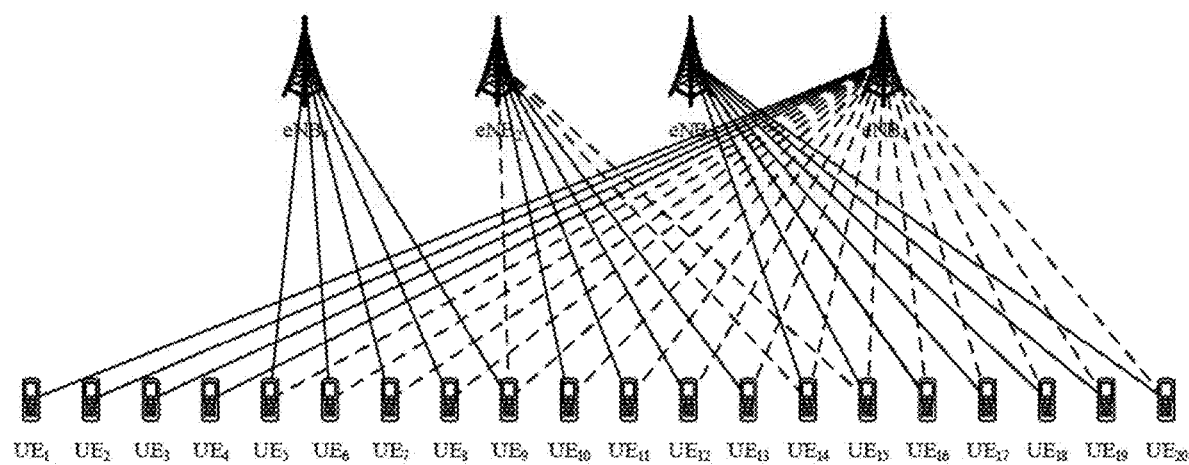
FIG. 6 illustrates an example of the interference-service relationship between any one of the base stations and any one of the UEs based on FIG. 4 in accordance with an embodiment of the present application.

For example, using the heterogeneous network shown in FIG. 4 as an example, the interference control server 400 identifies an interference-service relationship between any one of the base stations $eNB_1$-$eNB_4$ and any one of the $UE_1$-$UE_{20}$. FIG. 6 illustrates an example of the interference-service relationships between any one of the base stations $eNB_1$-$eNB_4$ and any one of the $UE_1$-$UE_{20}$ in accordance with an embodiment of the present application. As shown in FIG. 6, the interference-service relationship indicates whether any one of the $UE_1$-$UE_{20}$ is severed by any one of the base stations $eNB_1$-$eNB_4$ (represented by the solid lines) or interfered from any one of the base stations $eNB_1$-$eNB_4$ (represented by the dash lines) based on what is shown in FIG. 4

For example, as shown in FIGS. 4 and 6, the $UE_1$-$UE_4$ are severed by the base station $eNB_4$ and are not interfered from any one of the base stations $eNB_1$-$eNB_3$, because the $UE_1$-$UE_4$ are only within the communication range of the base station $eNB_4$ and not within the communication range of any one of the base stations $eNB_1$-$eNB_3$. On the other hand, the $UE_5$-$UE_9$ are severed by the base station $eNB_1$, the $UE_5$-$UE_8$ are interfered from the base station $eNB_4$ (because the $UE_5$-$UE_8$ are also within the communication range of the base station $eNB_4$), the $UE_9$ is interfered from the base stations $eNB_2$ and $eNB_4$ (because the $UE_9$ is also within the communication range of both the base stations $eNB_2$ and $eNB_4$). Similarly, the interference-service relationship for the other UEs can also be identified, as shown in FIG. 6.

The interference control server then groups the UEs into a plurality of UE groups (Step S52), wherein each UE in a same UE group has an identical interference-service relationship with all of the base stations.

For example, using the interference-service relationships between any one of the base stations $eNB_1$-$eNB_4$ and any one of the $UE_1$-$UE_{20}$ as shown in FIG. 6 for illustration purpose, the $UE_1$-$UE_4$ have an identical interference-service relationship with all of the base stations $eNB_1$-$eNB_4$ (i.e., having same solid lines and dash lines to all base stations $eNB_1$-$eNB_4$ for each of the $UE_1$-$UE_4$) and are therefore grouped together as the UE Group 1, the $UE_5$-$UE_8$ have an identical interference-service relationship with all of the base stations $eNB_1$-$eNB_4$ and are therefore grouped together as the UE Group 2, the $UE_9$ has an interference-service relationship with all of the base stations $eNB_1$-$eNB_4$ that is different from all other UEs and is therefore grouped as the UE Group 3, the $UE_{10}$-$UE_{13}$ have an identical interference-service relationship with all of the base stations $eNB_1$-$eNB_4$ and are therefore grouped together as the UE Group 4, the $UE_{14}$-$UE_{15}$ have an identical interference-service relationship with all of the base stations $eNB_1$-$eNB_4$ and are therefore grouped together as the UE Group 5, and the $UE_{16}$-$UE_{20}$ have an identical interference-service relationship with all of the base stations $eNB_1$-$eNB_4$ and are therefore grouped together as the UE Group 6. The result of the grouping of the UEs into a plurality of UE groups is shown in FIG. 7 in accordance with an embodiment of the present application.

The interference control server then identifies an UE group interference relationship among the UE groups (Step S54), wherein the UE group interference relationship indicates which ones of the UE groups may result in collision if simultaneously receiving downlink data in a same downlink subframe within a period.

Figure 7:
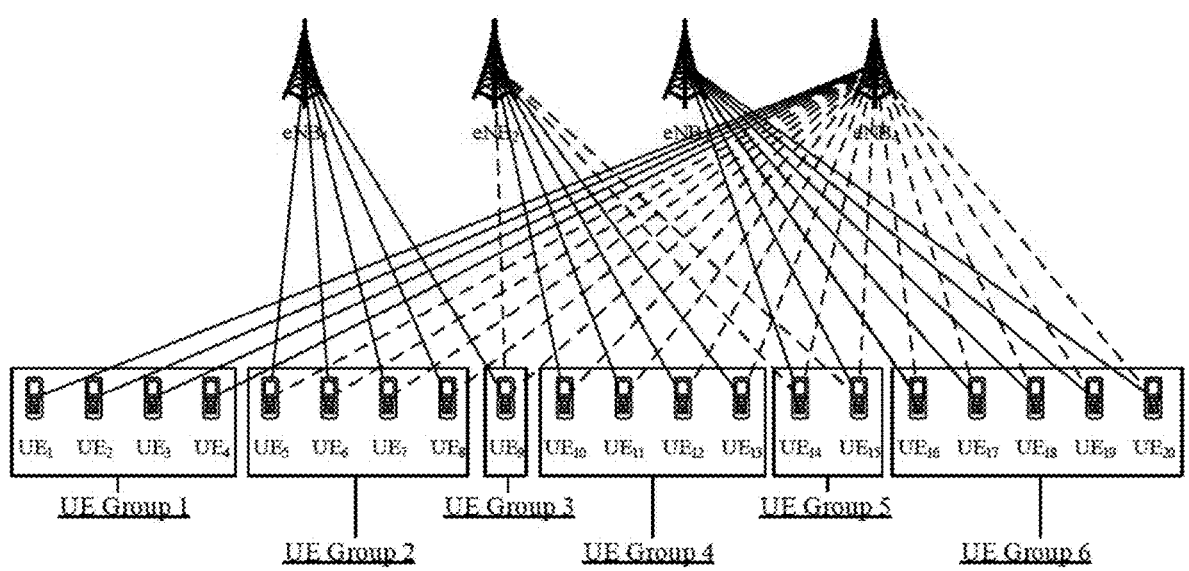
FIG. 7 illustrates an example of grouping the UEs into a plurality of UE groups based on FIG. 6 in accordance with an embodiment of the present application.
Figure 8:
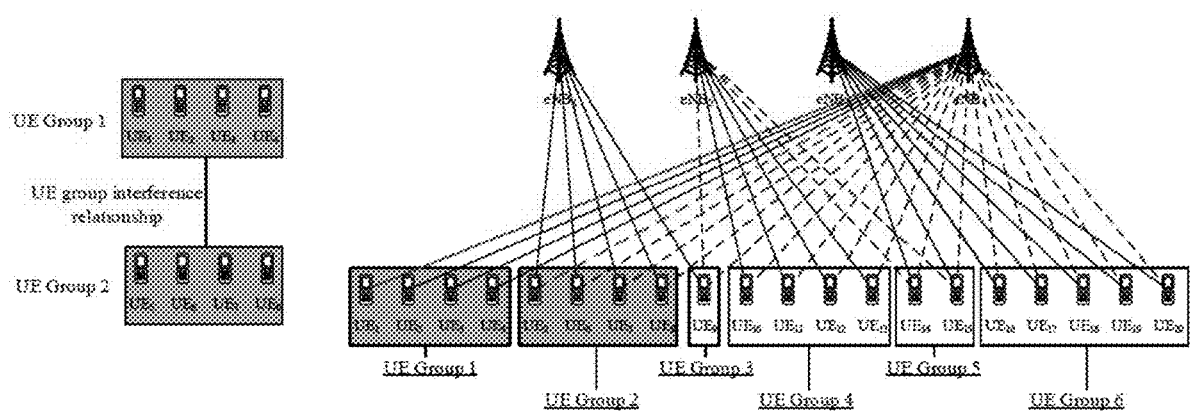
FIG. 8 illustrates an example of the UE group interference relationship between two UE groups based on FIG. 7 in accordance with an embodiment of the present application.
Figure 9:
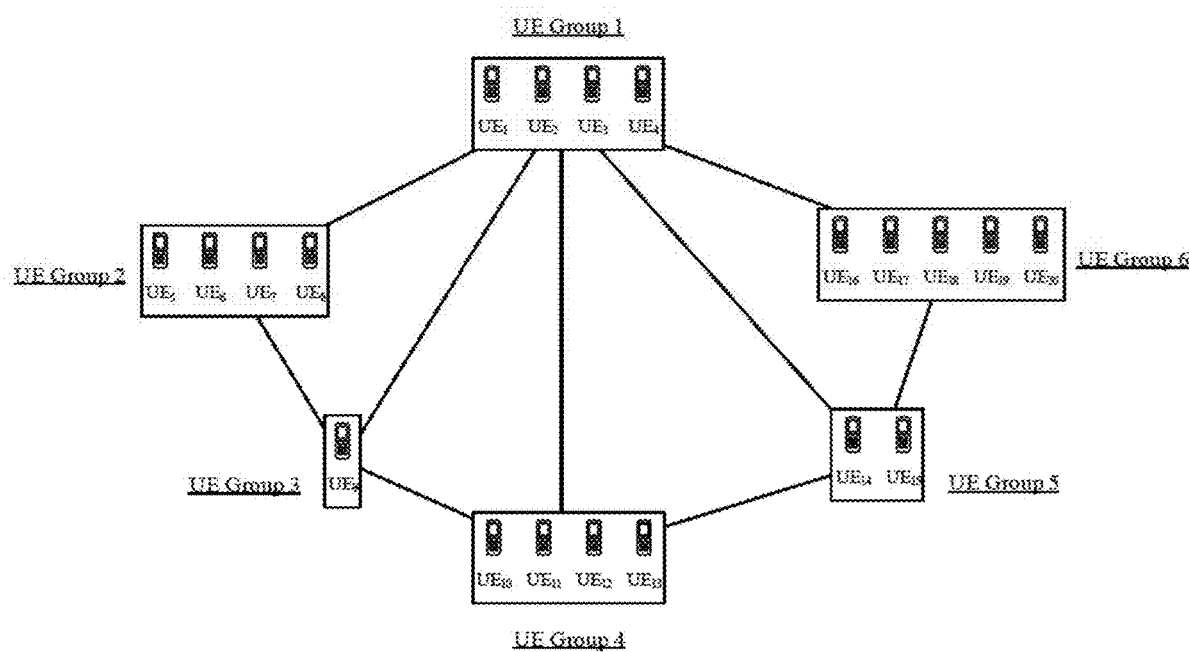
FIG. 9 illustrates an example of the UE group interference relationship among all UE groups based on FIG. 7 in accordance with an embodiment of the present application.

For example, using UE grouping result as shown in FIG. 7 for illustration purpose, the UEs in the UE Group 1 and the UEs in the UE Group 2 may result in collision if simultaneously receive downlink data in a same downlink subframe within a period. This is because if the downlink data are from the base station $eNB_4$, the UEs in both the UE Group 1 and the UE Group 2 can receive the downlink data; however, the UEs in the UE Group 2 are served by the base station $eNB_1$, not the station $eNB_4$, and should not receive the downlink data from the base station $eNB_4$. Therefore, as shown in FIG. 8, the UE group interference relationship between the UE Group 1 and the UE Group 2 is identified, and is represented by a solid line between the UE Group 1 and the UE Group 2. Similarly, the UE group interference relationship among the other UE groups is identified in the same manner. As a result, the UE group interference relationship among the UE groups is shown in FIG. 9 in accordance with an embodiment of the present application.

The interference control server then assigns, for each of the UE groups, a first set of time-specific downlink subframes within the period to a corresponding one of the UE groups as a set of almost blank subframes (ABS) specific to the corresponding one of the UE groups based on the UE group interference relationship and a resource demand for each of the UE groups (Step S56).

In other words, unlike the conventional interference control (in which the base station has only one set of ABS that is applied to all UEs served by the base station), in the above illustrated embodiment, each of the UE groups has its own, specific set of ABS.

In addition, since each set of ABS is assigned based on the resource demand for each of the UE groups, each of the UE groups that may result in collision can obtain the most proper network resource for data transmission. In other words, the UE group with more resource demand will be assigned less ABS (so more downlink subframes in the period will be used for downlink transmission), and the UE group with less resource demand will be assigned more ABS (so less downlink subframes in the period will be used for downlink transmission).

In some embodiments, the resource demand for each of the UE groups is proportional to a number of the UEs in each of the UE groups, an estimated amount of occupied physical resource blocks (PRB) of all of the UEs in each of the UE groups, an estimated throughput of all of the UEs in each of the UE groups, or a channel quality between each of the UE groups and a corresponding one of the base stations. These embodiments will be described later.

In an embodiment, the interference control server assigns the set of almost blank subframes (ABS) specific to the corresponding one of the UE groups (Step S56) by assigning, for each of the UE groups, a second set of time-specific downlink subframes (for downlink transmission) within the period to the corresponding one of the UE groups as a set of non-ABS of the corresponding one of the UE groups based on the UE Group interference relationship and the resource demand for each of the UE groups (Step S561); and assigning, for each of the UE groups, a rest of the downlink subframes (for downlink transmission) within the period that are not part of the set of non-ABS as the set of ABS of the corresponding one of the UE groups (Step S562).

Figure 10:
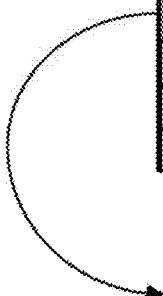
FIG. 10 illustrates different LTE TDD Frame configurations, including the LTE TDD2 Frame configuration.

In other words, in this embodiment, for each of the UE groups, a set of non-ABS in the period is first assigned to a corresponding UE group, and the rest of the downlink subframes (for downlink transmission) in the period will become ABS for the corresponding UE group. For example, FIG. 10 illustrates LTE TDD configurations. In the LTE TDD2 configuration, each period has twenty (20) subframes, including four (4) uplink subframes (i.e., U subframes) for uplink transmission, and sixteen (16) downlink subframes for downlink transmission (i.e., twelve (12) D subframes and four (4) S subframes). Within the sixteen (16) downlink subframes (i.e., Resources #1-16 in FIG. 10, corresponding to Subframes #0, 1, 3-6, 8 and 9 in the first half period and Subframes #0, 1, 3-6, 8 and 9 in the second half period), if a set of non-ABS, e.g., a set of twelve (12) downlink subframes, is assigned to a corresponding UE group as the non-ABS for downlink transmission, then the rest four (4) downlink subframes will become the set of ABS for the corresponding UE group. It should be noted that the "assignment" of the downlink subframes means the assignment of time-specific downlink subframes (i.e., downlink subframes with specific subframe numbers (e.g., Subframes #3-6)) within the period to the corresponding UE group, not just the "allocation" of downlink subframes without assigning specific subframe numbers to the corresponding UE group.

In an embodiment, the interference control server assigns the second set of time-specific downlink subframes within the period to the corresponding one of the UE groups as the set of non-ABS of the corresponding one of the UE groups (Step S561) by satisfying an assigning requirement that no two non-ABS assigned to the ones of the UE groups that may result in collision if simultaneously receiving downlink data in a same downlink subframe within the period are the same.

For example, using the UE Group interference relationship shown in FIG. 9 for illustration purpose, the UE Group 1, the UE Group 2 and the UE Group 3 form a UE Group interference relationship that the UEs in any two of the UE Group 1, the UE Group 2 and the UE Group 3 may result in collision if simultaneously receive downlink data in a same downlink subframe within a period. Therefore, the set of non-ABS for each of the UE Group 1, the UE Group 2 and the UE Group 3 is assigned by satisfying an assigning requirement that no two non-ABS assigned to the UE Group 1, the UE Group 2 and the UE Group 3 are the same. In other words, each of the UE Group 1, the UE Group 2 and the UE Group 3 has its own set of non-ABS that does not overlap with any of the non-ABS that are assigned to the other two UE Groups for downlink transmission. Therefore, no collision will occur among the UE Group 1, the UE Group 2 and the UE Group 3, because the downlink transmission will be performed by the UE Group 1, the UE Group 2 and the UE Group 3 using the totally non-overlapping downlink subframes (i.e., non-ABS) in the period.

In other words, in this embodiment, since each set of the non-ABS (and therefore each set of ABS) is assigned to a corresponding UE group based on the identified UE group interference relationship, the collision among the UEs in these UE groups (and therefore the interference among the corresponding base stations) can be prevented, because the non-ABS for each of these UE groups that may result in collision do not overlap with each other.

In an embodiment, the interference control server assigns the second set of time-specific downlink subframes within the period to the corresponding one of the UE groups as the set of non-ABS of the corresponding one of the UE groups comprises (Step S561) by identifying, using the UE group interference relationship, a number of UE group cliques, each of the UE group cliques consists of a maximum number of UE groups that may result in collision if simultaneously receiving downlink data in a same downlink subframe within the period (Step S5611); for each of the UE groups in each of the UE group cliques, allocating, a number of downlink subframes within the period to a corresponding one of the UE groups in a corresponding one of the UE group cliques substantially proportional to the resource demand for each of the UE groups in the corresponding one of the UE group cliques (Step S5612), as shown in FIG. 5C.

For example, using the UE Group interference relationship shown in FIG. 9 for illustration purpose, the UE Group 1, the UE Group 2 and the UE Group 3 form a UE group clique (see FIG. 11) consists of a maximum number (i.e., three (3)) of UE groups that may result in collision if simultaneously receiving downlink data in a same downlink subframe within the period, because the UEs in any two of the UE Group 1, the UE Group 2 and the UE Group 3 may result in collision if simultaneously receive downlink data in a same downlink subframe within a period. Similarly, the UE Group 1, the UE Group 3 and the UE Group 4 form another UE group clique, the UE Group 1, the UE Group 4 and the UE Group 5 form another UE group clique, and the UE Group 1, the UE Group 5 and the UE Group 6 form another UE group clique.

Since each UE group in a UE group clique may have its own different resource demand, allocating proper downlink subframes for downlink transmission for each UE group in a UE group clique is made substantially proportional to the resource demand of the for each of the UE groups in the corresponding one of the UE group cliques. This would allow the network resource to be allocated more efficiently. In other words, the UE group with more resource demand will be allocated more downlink subframes in the period for downlink transmission (and therefore less ABS), and the UE group with less resource demand will be allocated less downlink subframes in the period for downlink transmission (and therefore more ABS).

In some embodiments, the resource demand for each of the UE groups in the corresponding one of the UE group cliques is proportional to a number of the UEs in each of the UE groups in the corresponding one of the UE group cliques, an estimated amount of occupied physical resource blocks (PRB) of all of the UEs in each of the UE groups in the corresponding one of the UE group cliques, an estimated throughput of all of the UEs in each of the UE groups, or a channel quality between each of the UE groups and a corresponding one of the base stations in the corresponding one of the UE group cliques.

Figure 11:
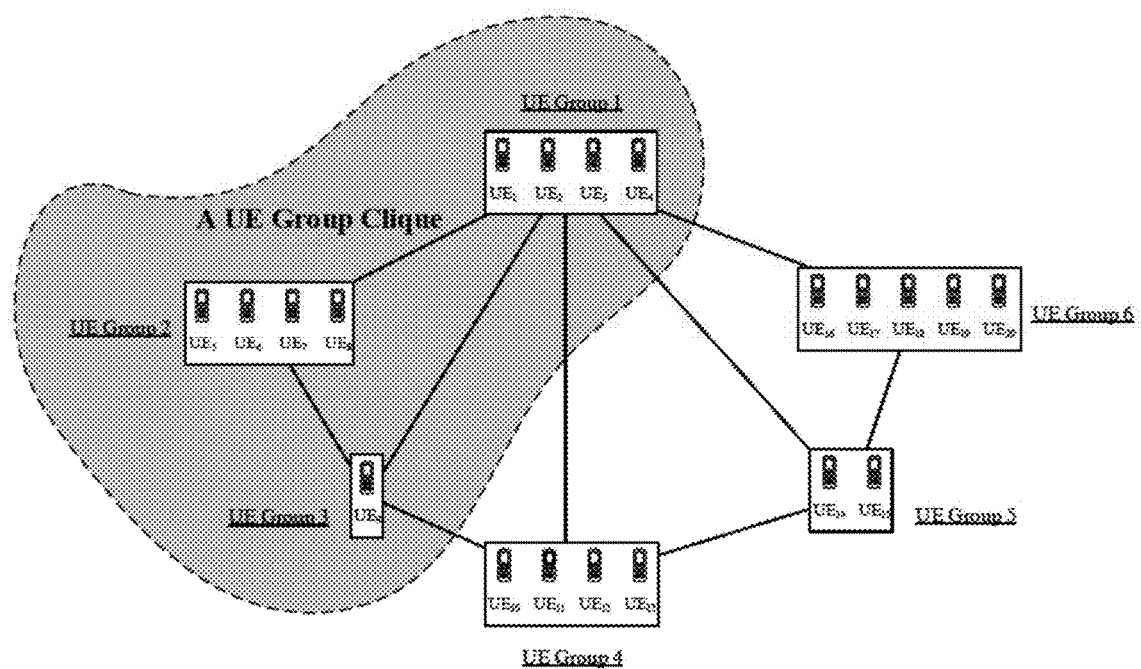
FIG. 11 illustrates an example of an UE group clique in accordance with an embodiment of the present application.

In the embodiment where the resource demand for each of the UE groups in the corresponding one of the UE group cliques is proportional to a number of the UEs in each of the UE groups in the corresponding one of the UE group cliques, taking the UE Group interference relationship shown in the embodiment in FIGS. 9 and 11 for illustration purpose, the UE Group 1, the UE Group 2 and the UE Group 3 forms a UE group clique such that the UEs in any two of the UE Group 1, the UE Group 2 and the UE Group 3 may result in collision if simultaneously receive downlink data in a same downlink subframe within a period. As shown in FIGS. 9 and 10, the UE Group 1 has four (4) UEs, the HE Group 2 has four (4) UEs, and the UE Group 3 has one (1) UEs. In addition, as mentioned, in the LTE TDD 2 configuration, there are sixteen (16) downlink subframes for downlink transmission. In this embodiment, it is assumed that the resource demand of each of the UEs is equal. Therefore, the resource demands $D_1$, $D_2$, and $D_3$ respectively for the UE Group 1, the UE Group 2 and the UE Group 3 in the LTE TDD 2 configuration are as follows:

$$D_1 = \left[\frac{4}{4+4+1} * 16\right] = 7$$

$$D_2 = \left[\frac{4}{4+4+1} * 16\right] = 7$$

$$D_3 = \left[\frac{1}{4+4+1} * 16\right] = 2$$

Figure 12:
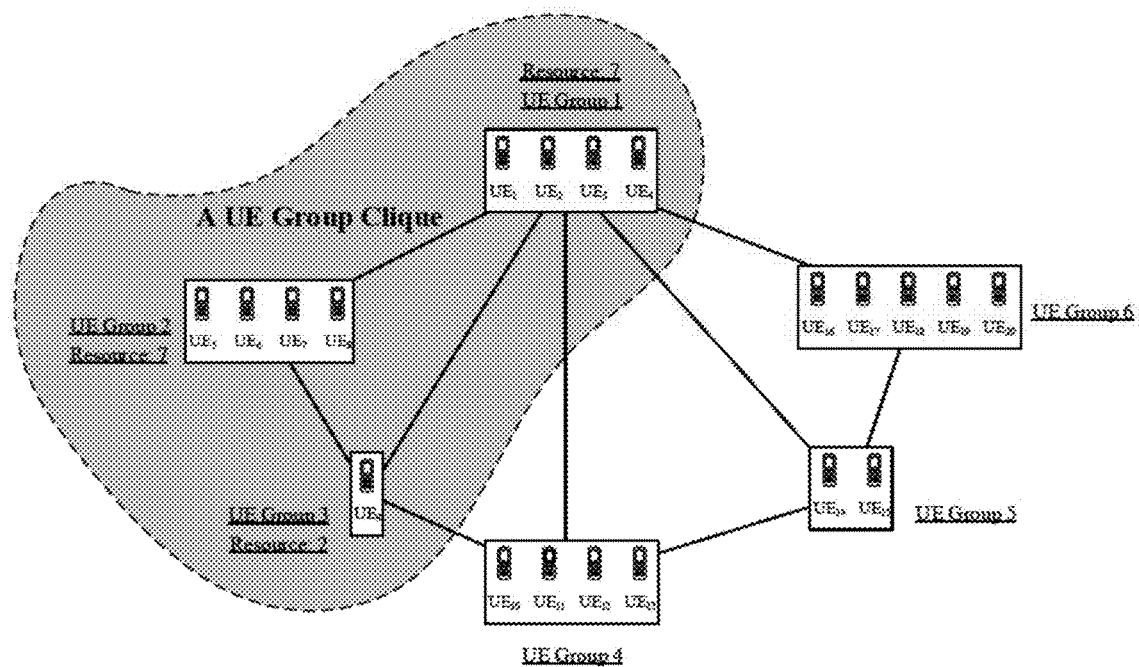
FIG. 12 illustrates an example of an allocation of the non-ABS in the UE group clique in FIG. 11 based on the resource demand in accordance with an embodiment of the present application.
Figure 13:
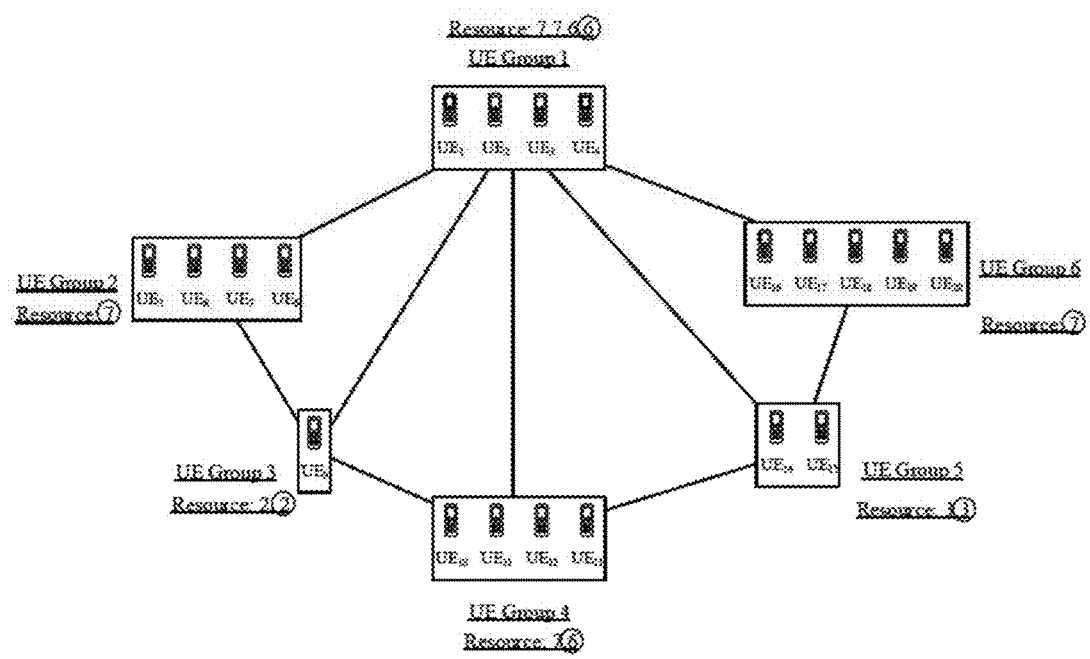
FIG. 13 illustrates an example of an allocation of the non-ABS for all of the UE groups in FIG. 11 based on the resource demand in accordance with an embodiment of the present application.
Figure 14:
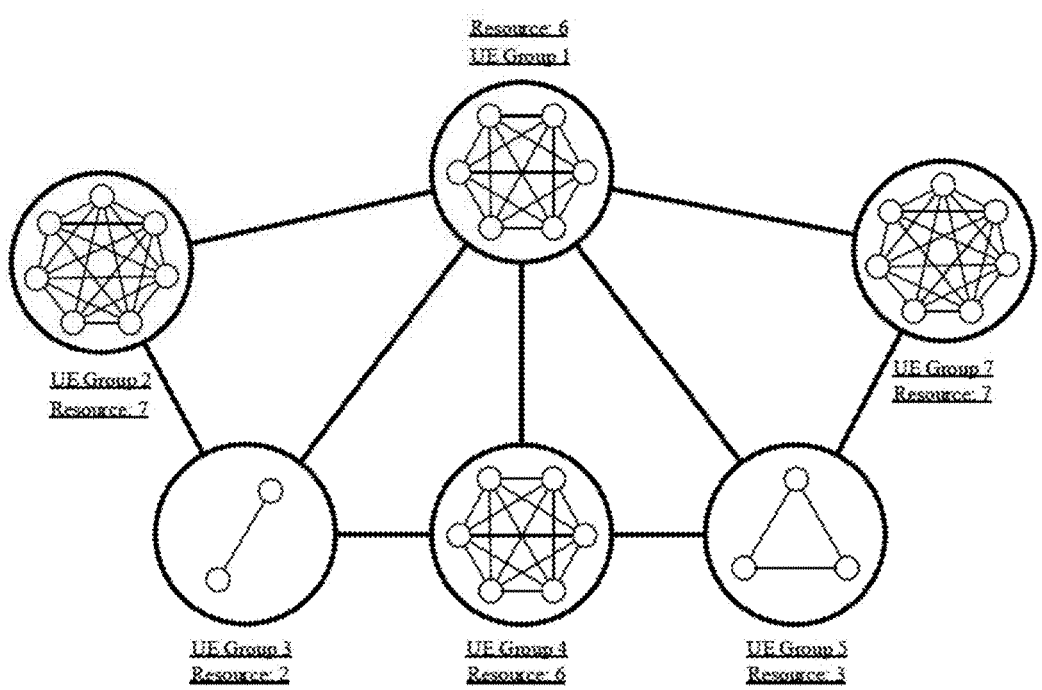
FIG. 14 illustrates an example of the final allocation result of the non-ABS for all of the UE groups in FIG. 11 based on the resource demand in accordance with an embodiment of the present application.

Therefore, in this example, the UE Group 1 will be allocated seven (7) non-ABS (out of sixteen (16) downlink subframes for downlink transmission) for downlink transmission (and therefore nine (9) ABS), the UE Group 2 will be allocated seven (7) non-ABS for downlink transmission (and therefore nine (9) ABS), the UE Group 3 will be allocated seven (2) non-ABS for downlink transmission (and therefore nine (14) ABS), as shown in FIG. 12. Similar process can be performed for the UE groups with the UE Group interference relationship (e.g., the group clique of the UE Group 1, the UE Group 3 and the UE Group 4, the group clique of the UE Group 1, the UE Group 4 and the UE Group 5, the group clique of the UE Group 1, the UE Group 5 and the UE Group 6) to determine the number of non-ABS (and therefore the number of ABS) for each UE group, as shown in FIG. 13.

It should be noted that the allocation of the downlink subframes to a UE group simply means that the UE group will allocated downlink subframes, but the specific subframe number (e.g., subframe #3)) for each of the allocated downlink subframes within the period has not be assigned yet. For example, the UE Group 1 will be allocated seven (7) non-ABS for downlink transmission, but the specific subframe number for each of the allocated downlink subframes has not been assigned yet.

In the embodiment where the resource demand for each of the UE groups is proportional to an estimated amount of occupied physical resource blocks (PRB) of all of the UEs in each of the UE groups that may result in collision, the estimated amount of occupied PRB may be determined by measuring the quality of the channel the UE uses and the data size the UE needs to transmit. For example, if the quality of the channel the UE uses allows Modulation and Coding Schemes (MCS) 22, it means that each PRB of a single layer can transmit 55 Bytes in LTE. If the transmission queue in the UE has 600 Bytes to be transmitted, it means that this UE would require about 11 PRBs (i.e., 600/55). By determining the estimated PRB for each of the UEs in the UE groups that may result in collision, the resource demand for each of the UE groups can be determined in the same manner as what is illustrated in the above example of the resource demand proportional to the number of the UEs.

In the embodiment where the resource demand for each of the UE groups is proportional to an estimated throughput of all of the UEs in each of the UE groups that may result in collision, the throughput of each UE can be estimated by several ways. For example, the throughput of each UE can be estimated based on the average throughput within a certain period of time, by using existing prediction algorithms, etc. Once the estimated throughput of all of the UEs in each of the UE groups that may result in collision has been determined, the resource demand for each of the UE groups can be determined in the same manner as what is illustrated in the above example of the resource demand proportional to the number of the UEs.

In the embodiment where the resource demand for each of the UE groups is proportional to a channel quality between each of the UE groups that may result in collision and a corresponding one of the base stations, the channel quality can be represented by the allowable Modulation and Coding Schemes (MCS) for the particular channel. Once the channel quality of all of the UEs in each of the UE groups that may result in collision and a corresponding one of the base stations has been determined, the resource demand for each of the UE groups can be determined in the same manner as what is illustrated in the above example of the resource demand proportional to the number of the UEs.

In an embodiment, when one UE group belongs to more than one of the UE group cliques, and the number of downlink subframes allocated to the one UE group is not the same for each of the more than one of the UE group cliques, by the interference control server allocates a smallest number of downlink subframes to the one UE group as the number of downlink subframes within the period.

For example, in the embodiment shown in FIG. 13, UE Group 1 belongs to four (4) UE group cliques (i.e., the UE group clique consisting of the UE Groups 1, 2 and 3, the UE group clique consisting of the UE Groups 1, 3 and 4, the UE group clique consisting of the UE Groups 1, 4 and 5, and the UE group clique consisting of the UE Groups 1, 5 and 6), and the number of downlink subframes (non-ABS) allocated to the UE Group 1 is not the exactly same for each of the four (4) UE group cliques. In this embodiment, as shown in FIG. 13, the number of downlink subframes (non-ABS) allocated to the UE Group 1 for each of the four (4) UE group cliques is 7, 7, 7 and 6. Since the number of downlink subframes (non-ABS) allocated to the UE Group 1 for each of the four (4) UE group cliques is not the same, the interference control server in this embodiment will allocate the smallest one (i.e., 6 in this example) of these numbers to the UE Group 1 as the number of downlink subframes (non-ABS) within the period.

Similarly, the UE Group 4 belongs to two (2) UE group cliques (i.e., the UE group clique consisting of the UE Groups 1, 3 and 4, and the UE group clique consisting of the UE Groups 1, 4 and 5), and the number of downlink subframes (non-ABS) allocated to the UE Group 4 for each of the two (2) UE group cliques is 7, 6. Since the number of downlink subframes (non-ABS) allocated to the UE Group 4 for each of the two (2) UE group cliques is not the same, the interference control server in this embodiment will allocate the smallest one (i.e., 6 in this example) of these numbers to the UE Group 4 as the number of downlink subframes (non-ABS) within the period.

On the other hand, although the UE Group 5 also belongs to two (2) UE group cliques (i.e., the UE group clique consisting of the UE Groups 1, 4 and 5, and the UE group clique consisting of the UE Groups 1, 5 and 5), and the number of downlink subframes (non-ABS) allocated to the UE Group 5 for each of the two (2) UE group cliques is 3, 3. Since the number of downlink subframes (non-ABS) allocated to the UE Group 5 for each of the two (2) UE group cliques is the same, the interference control server in this embodiment will allocate this number (i.e., 3 in this example) to the UE Group 5 as the number of downlink subframes (non-ABS) within the period.

In an embodiment, the interference control server assigns, for each of the UE groups, each downlink subframe in the number of downlink subframes within the period with a specific number using a coloring algorithm, such that each of the downlink subframes allocated to any of the UE groups in a corresponding one of the UE group cliques has a different specific number, wherein the specific number represent a time-specific downlink subframe within the period.

In some embodiments, the coloring algorithm can be selected from any existing coloring algorithm, such as Welsh-Powell Algorithm, Variable Neighborhood Search, Partial Solutions and Reactive Tabu Scheme, Variable Space Search, TS-Div/Int Algorithm, Distributed Coloration Neighborhood Search, Genetic and Hybrid Algorithm, Adaptive Memory Algorithm, Metaheuristic approach, Evolutionary approach with Diversity Guarantee, Memetic Algorithm, Quantum Annealing Algorithm, Distributed Hybrid Quantum Annealing Algorithm, Independent Set Extraction, Hybrid Evolutionary Algorithm, Multiagent Fusion Search, Tabu Search Techniques, DSATUR Algorithm, Hill Climbing Approach, Ant Algorithm, Max-Min Ant Algorithm, etc.

Figure 15:
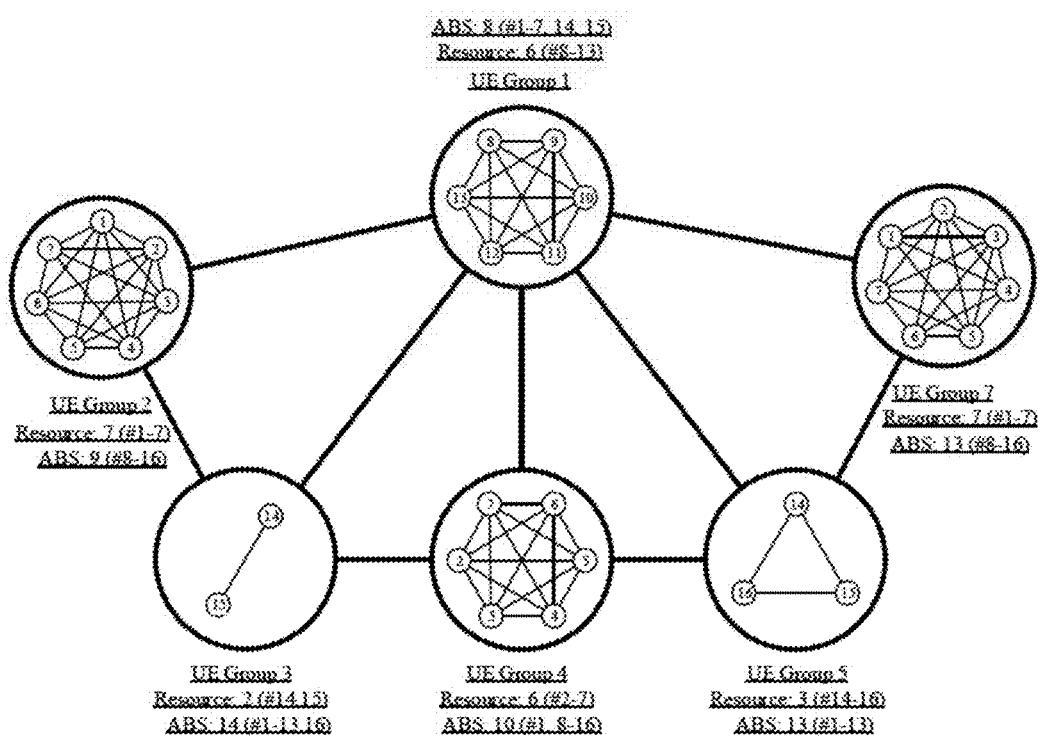
FIG. 15 illustrates an example of the assignment result of the non-ABS and the ABS for all of the UE groups in FIG. 11 based on the resource demand in accordance with an embodiment of the present application.

In the example shown in FIG. 15, the Welsh-Powell Algorithm is used to assign a specific number for each of the allocated downlink subframes to the correspond UE Group. For example, the UE Group 1 has been assigned Resources #8-13 (corresponding to Subframe #9 in the first half period and Subframes #0, 1, and 3-5 in the second half period as shown in FIG. 10), the UE Group 2 has been assigned Resources #1-7 (corresponding to Subframes #0-7 (all in the first half period) as shown in FIG. 10), the UE Group 3 has been assigned Resources #14-15 (corresponding to Subframes #5-6 (both in the second half period) as shown in FIG. 10). In other words, each of the downlink subframes allocated to any of the UE groups in a corresponding one of the UE group cliques has a different specific number representing a time-specific downlink subframe within the period, and none of the sixteen (16) resources will be repeatedly assigned to two different UE groups in the same UE group clique.

Therefore, no two non-ABS assigned to the UE Group 1, the UE Group 2 and the UE Group 3 are the same. In other words, each of the UE Group 1, the UE Group 2 and the UE Group 3 has its own set of non-ABS that does not overlap with any of the non-ABS that are assigned to the other two UE Groups in the same UE group clique for downlink transmission. Therefore, no collision will occur among the UE Group 1, the UE Group 2 and the UE Group 3 in the same UE group clique, because the downlink transmission will be performed by the UE Group 1, the UE Group 2 and the UE Group 3 using the totally non-overlapping downlink subframes (i.e., non-ABS) in the period. Accordingly, the collision among the UEs in the same UE group clique (and therefore the interference among the corresponding base stations) can be prevented, because the non-ABS for each of the UE groups in the same UE group clique (i.e., the UE groups that may result in collision) do not overlap with each other.

As a result, in the embodiment shown in FIG. 15, the UE Group 1 is assigned a set of non-ABS as Resources #8-13 (corresponding to Subframe #9 in the first half period and Subframes #0, 1 and 3-5 in the second half period), which means that the UE Group 1 is assigned a set of ABS as Resources #1-7 and 14-16 (corresponding to Subframes #0, 1, 3-6 and 8 in the first half period and Subframes #6, 8 and 9 in the second half period), i.e., the rest of the downlink subframes for downlink transmission in the same period. In addition, the UE Group 2 is assigned a set of non-ABS as Resources #1-7 (corresponding to Subframes #0, 1, 3-6 and 8 in the first half period), which means that the UE Group 2 is assigned a set of ABS as Resources #8-16 (corresponding to Subframe #9 in the first half period and Subframes #0, 1, 3-6, 8 and 9 in the second half period), i.e., the rest of the downlink subframes for downlink transmission in the same period. Also, the UE Group 3 is assigned a set of non-ABS as Resources #14 and 15 (corresponding to Subframes #6 and 8 in the second half period), which means that the UE Group 3 is assigned a set of ABS as Resources #1-13 and 16 (corresponding to Subframes #0, 1, 3-6 and 8 in the first half period and Subframes #0, 1, 3-5 and 9 in the second half period), i.e., the rest of the downlink subframes for downlink transmission in the same period. Similarly, the assignments of the non-ABS (and therefor ABS) for the UE Groups 4-6 are also shown in FIG. 15.

As shown in FIG. 15, no collision will occur among the UE Group 1, the UE Group 2 and the UE Group 3 in the same UE group clique, because the downlink transmission will be performed by the UE Group 1, the UE Group 2 and the UE Group 3 using the totally non-overlapping downlink subframes (i.e., non-ABS) in the period; i.e., the UE Group 1 uses Resources #8-13 for downlink transmission, the UE Group 2 uses Resources #1-7 for downlink transmission, and the UE Group 3 uses Resources #14-15 for downlink transmission. Accordingly, no UEs from different UE groups of the same UE group clique will perform downlink transmission in the same downlink subframe in a period, which prevents any collision among the UE group in the same UE group clique and therefore prevents interference among the corresponding base stations.

In an embodiment, when an assigned specific number in a corresponding one of the UE groups corresponds to a time-specific downlink subframe that does not exist within the period, and there is another one of the UE groups belonging to a same one of the UE group cliques as the corresponding one of the UE groups and the another one of the UE groups has a least UE group interference relationship with the rest of the UE groups, the interference control server switches the assigned specific number in the corresponding one of the UE groups with another specific number in the another one of the UE groups. After the switching, the interference control server unassigns the assigned specific number that corresponds to the time-specific downlink subframe that does not exist within the period from the another one of the UE groups.

Figure 16:
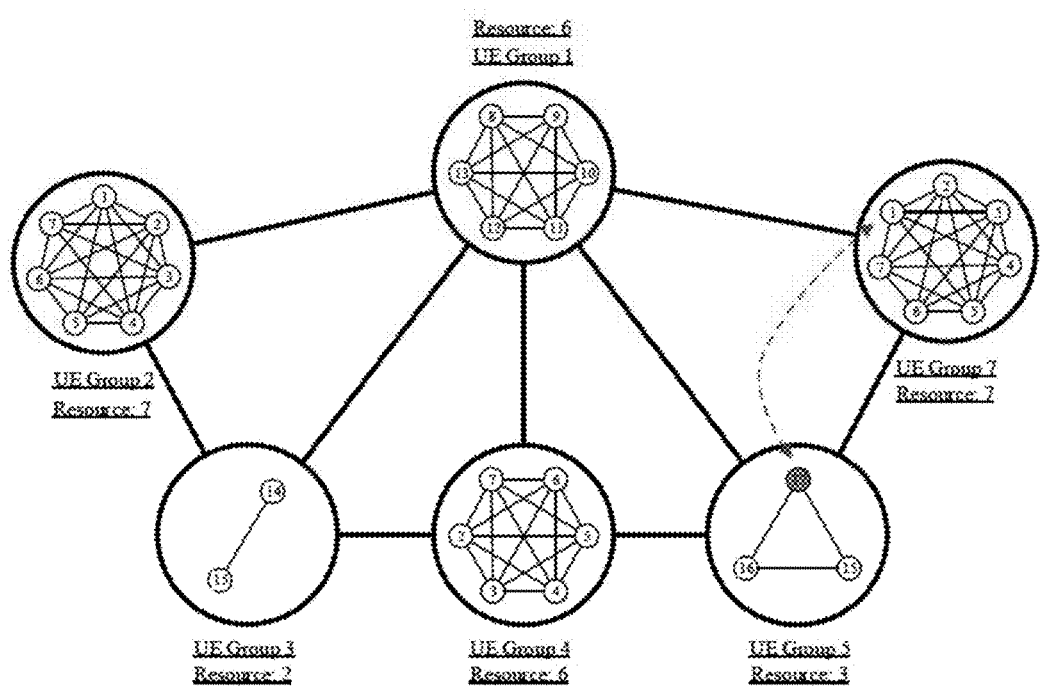
FIGS. 16 and 17 illustrate an example of the assignment adjustment of the non-ABS after the assignment of the non-ABS is made in accordance with an embodiment of the present application.
Figure 17:
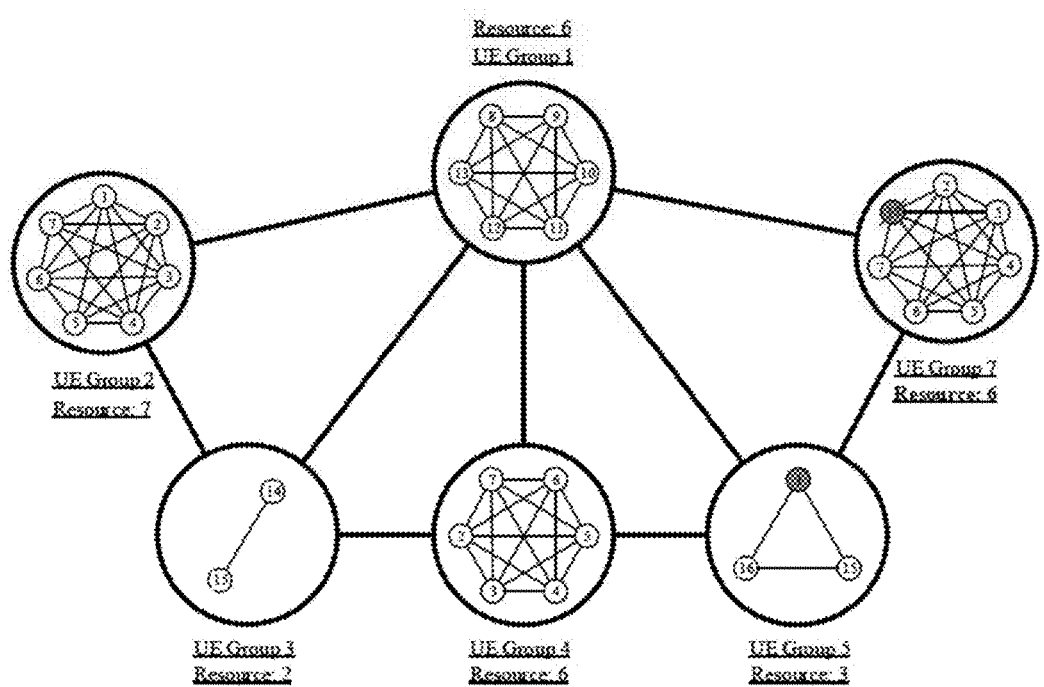

For example, as shown in FIG. 16, the UE Group 5 has been assigned Resource #17, which does not exist within the period because there are only sixteen resources/downlink subframes in a period under LTE TDD 2 configuration for downlink transmission. On the other hand, in the same UE group clique the UE Group 5 belongs to (i.e., the UE group clique consisting the UE Groups 1, 5 and 6), there is another UE group (i.e., the UE Group 6) has the least UE group interference relationship with the rest of the UE groups. More specifically, in the UE group clique consisting the UE Groups 1, 5 and 6, the UE Group 1 has five (5) UE group interference relationships with the rest of the UE groups (i.e., five (5) solid lines directly connected to the other UE groups, including the UE group interference relationships with the UE Groups 2, 3, 4, 5 and 6), the UE Group 5 has five (3) UE group interference relationships with the rest of the UE groups (i.e., three (3) solid lines directly connected to the other UE groups, including the UE group interference relationships with the UE Groups 1, 4 and 6), and the UE Group 6 has only two (2) UE group interference relationships with the rest of the UE groups (i.e., two (2) solid lines directly connected to the other UE groups, including the UE group interference relationships with the UE Groups 1 and 5). In other words, the UEs in the UE Group 6 would have a less chance to have collision with the other UEs than the UEs in the UE Groups 1 and 5. Therefore, in this embodiment, the interference control server switches the assigned specific number (i.e., 17 in this example) in the UE Group 5 with a specific number in the UE Group 6 (e.g., 1 in this example, and in another embodiment, any one of the assigned numbers in the UE Group 6). After the switching, the interference control server unassigns the non-existing assigned specific number 17 from the UE Group 6, as shown in FIG. 17.

In another embodiment, when an assigned specific number in a corresponding one of the UE groups corresponds to a time-specific downlink subframe that does not exist within the period, and none of the UE groups that belongs to a same one of the UE group cliques as the corresponding one of the UE groups has a less UE group interference relationship with the rest of the UE groups than the corresponding one of the UE groups does, the interference control server unassigns the assigned specific number that corresponds to the time-specific downlink subframe that does not exist within the period from the corresponding one of the UE groups.

For example, if the UE Group 5 has been assigned Resource #17, which does not exist within the period, but in the same UE group clique the UE Group 5 belongs to (i.e., the UE group clique consisting the UE Groups 1, 5 and 6), none of the UE Groups 1, 5 and 6 has a less UE group interference relationship with the rest of the UE groups than the other two UE groups do, in the embodiment, the interference control server unassigns the non-existing assigned specific number 17 from the UE Group 5.

In an embodiment, when a change of the resource demand for at least one of the UE groups is detected, the interference control server updates only the set of ABS of the at least one of the UE groups and the set of ABS of any one of the UE groups that may result in collision if simultaneously receiving downlink data in a same downlink subframe within the period with the at least one of the UE groups based on a current resource demand for the at least one of the UE groups and the any one of the UE groups, without updating the set of ABS of the rest of the UE groups, by satisfying the assigning requirement.

Figure 18:
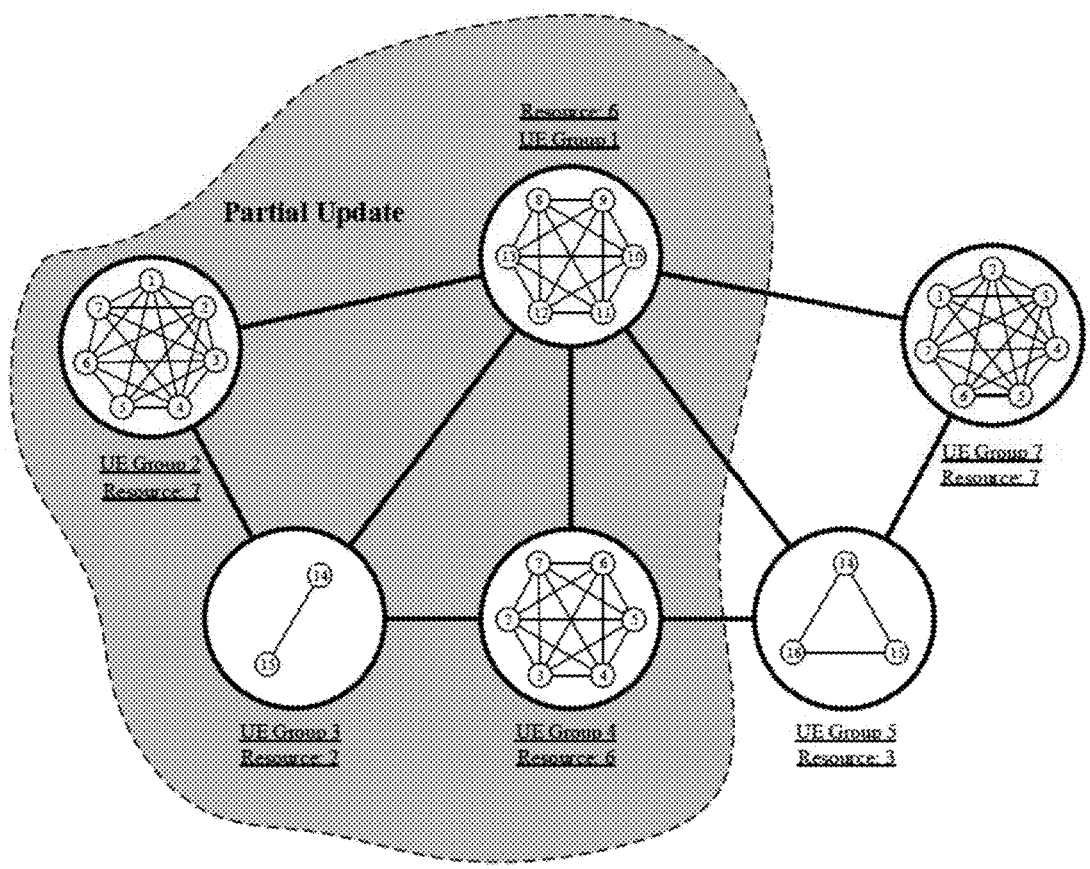
FIG. 18 illustrates an example of the partial assignment update of the non-ABS based on the change of the resource demand in accordance with an embodiment of the present application.

For example, in the embodiment as shown in FIG. 18, when a change of the resource demand for the UE Group 3 is detected, the interference control server updates only the set of non-ABS (and therefor the set of ABS) of the UE Group 3 and the set of non-ABS(and therefor the set of ABS) of any of the UE groups that may result in collision if simultaneously receiving downlink data in a same downlink subframe within the period with the UE Group 3; i.e., any of the UE groups that has a solid line directly connected to the UE Group 3. In this example as shown in FIG. 18, the UE Group 3 has three (3) solid lines directly connected to the UE Groups 1, 2 and 4, respectively. Therefore, when a change of the resource demand for the UE Group 3 is detected, the interference control server updates only the set of non-ABS (and therefor the set of ABS) of the UE Groups 3 and the sets of non-ABS (and therefor the set of ABS) of the UE Groups 1, 2 and 4 based on UE group interference relationship and the resource demand for the UE Groups 1, 2, 3 and 4 and satisfying the assigning requirement, without updating the set of non-ABS (and therefor the set of ABS) of the rest of the UE groups (i.e., the UE Groups 5 and 6). In other words, the assignment of the set of non-ABS (and therefor the set of ABS) of the UE Groups 5 and 6 will not be changed during this partially updating process.

Figure 19:
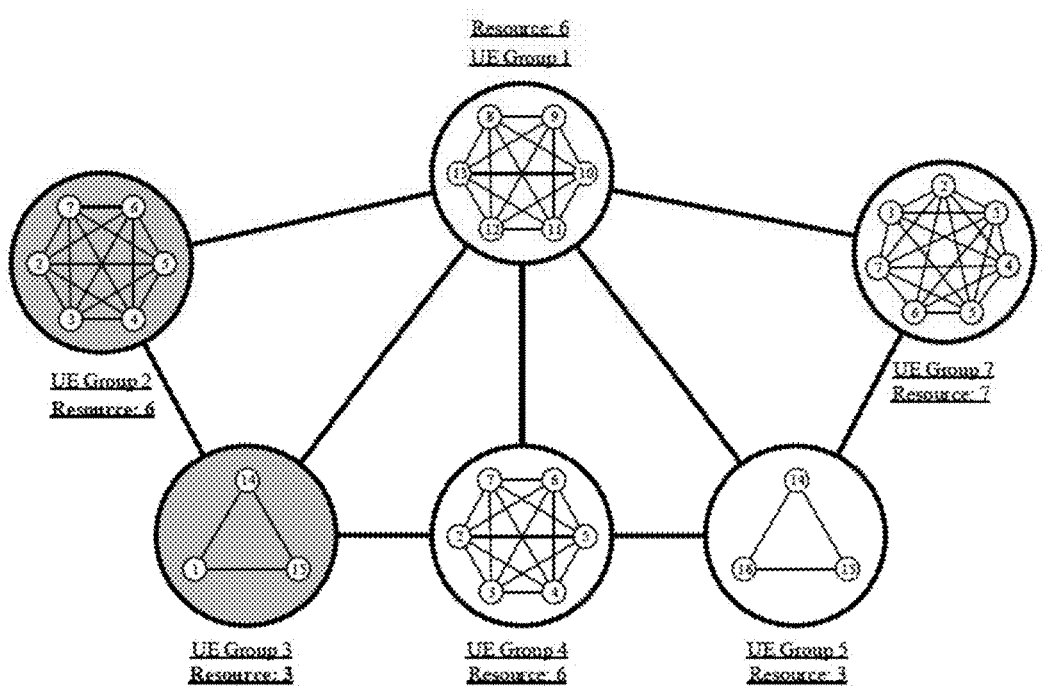
FIG. 19 illustrates an example of the result of the partial assignment update of the non-ABS based on the change of the resource demand in accordance with an embodiment of the present application.

FIG. 19 illustrates an example of the updated assignment of the non-ABS for the UE Groups 1, 2, 3 and 4 after the partially updating process. In this example, assuming the updated resource demands $D_1$, $D_2$, $D_3$ and $D_4$ for the UE Groups 1, 2, 3 and 4 are 6, 6, 3 and 6, the UE Group 3 is allocated one (1) additional resource, and the UE Group 2 is allocated one less resource. By applying the coloring algorithm such as the Welsh-Powell Algorithm and satisfying the assigning requirement (i.e., no two non-ABS assigned to the ones of the UE groups that may result in collision if simultaneously receiving downlink data in a same downlink subframe within the period are the same), the UE Group 3 is assigned one (1) additional resource (i.e., Resource #1, corresponding to Subframe #2 in FIG. 10), and the UE Group 2 loses one resource (i.e., Resource #1, corresponding to Subframe #2 in FIG. 10), and the assignments for the UE Groups 1 and 4 remain unchanged.

In another embodiment, when the assigning requirement cannot be satisfied by the above partially updating process, the interference control server updates the set of ABS of each of the UE groups by reassigning another set of time-specific downlink subframes within the period to a corresponding one of the UE groups as the ABS of the corresponding one of the UE groups based on the UE group interference relationship and the current resource demand for each of the UE groups and satisfying the assignment requirement.

In other words, when the above partially updating process is not possible to satisfy the assigning requirement, then interference control server performs the update process to all of the UE groups based on the UE group interference relationship and the current resource demand for each of the UE groups and satisfying the assignment requirement.

In an embodiment, the interference control server collects the interference-service information of each of the UEs from the base stations, and the interference-service information identifies the interference-service relationship based on the interference-service information of each of the UEs.

Figure 20:
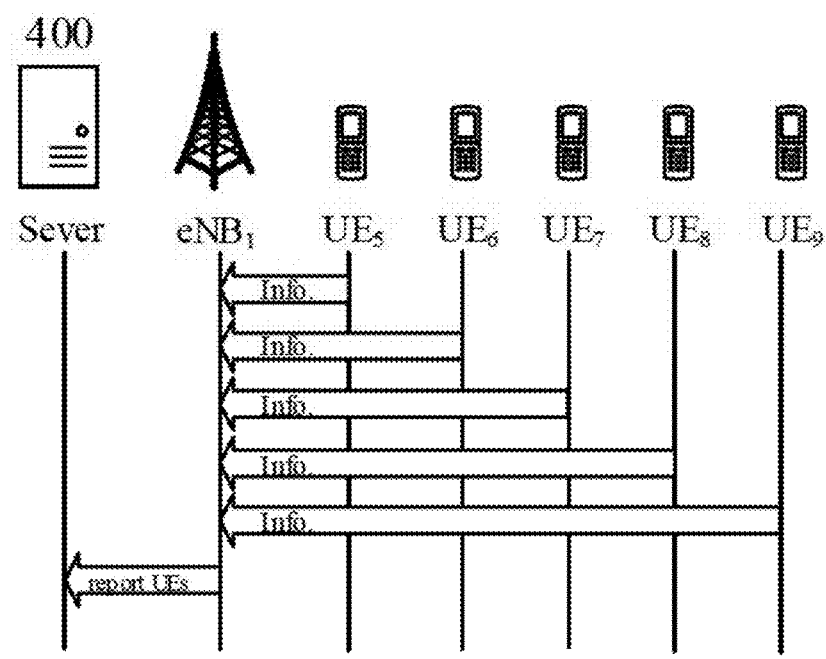
FIG. 20 illustrates a call flow performed among the interference control server, the base station, the UEs in accordance with an embodiment of the present application.

FIG. 20 illustrates a call flow performed among the interference control server, the base station, the UEs in accordance with an embodiment of the present application. As shown in FIG. 20, which uses the base station $eNB_1$ as an example, all UEs served by the base station $eNB_1$ (including the $UE_5$, the $UE_6$, the $UE_7$, the $UE_8$, and the $UE_9$) will report the interference-service information (which can be used to identify the interference-service relationship based on the interference-service information of each of the UEs) to their serving base station $eNB_1$, and the base station $eNB_1$ will report the interference-service information of each of the UEs back to the interference control server. The same process will also be performed by the rest of the UEs and the rest of the base stations in the heterogeneous network. Therefore, the interference control server collects the interference-service information of each of the UEs from the base stations, and identifies the interference-service relationship based on the interference-service information of each of the UEs.

The above illustrated embodiments are directed to the time domain applications in the inter-cell interference coordination. However, the same concepts are also applicable to the frequency domain applications in the inter-cell interference coordination.

In particular, in the time domain applications, the downlink transmission for each UE is performed in the downlink subframes in a period. On the other hand, in the frequency domain applications, the downlink transmission for each UE is performed in the sub-bands a frequency band. For example, there are thirteen (13) sub-bands in a frequency band of 20 MHz bandwidth in the heterogeneous network for downlink transmission. Therefore, the same concepts are also applicable to the frequency domain applications in the inter-cell interference coordination when considering the sub-bands a frequency band in the frequency domain similar to the downlink subframes in a period in the time domain.

More specifically, as mentioned, in the time domain applications, the interference control server identifies the UE group interference relationship among the UE groups, which indicates which ones of the UE groups may result in collision if simultaneously receiving downlink data in a same downlink subframe within a period. Similarly, in the frequency domain applications, the interference control server identifies the UE group interference relationship among the UE groups, which indicates which ones of the UE groups would result in collision if simultaneously receiving downlink data in a same sub-band within a frequency band.

In addition, as mentioned, in the time domain applications, the interference control server then assigns, for each of the UE groups, a first set of time-specific downlink subframes within the period to a corresponding one of the UE groups as a set of almost blank subframes (ABS) specific to the corresponding one of the UE groups based on the UE group interference relationship and a resource demand for each of the UE groups. Similarly, in the frequency domain applications, the interference control server then assigns, for each of the UE groups, a first set of frequency-specific sub-bands within the frequency band to a corresponding one of the UE groups as a set of non-preferred downlink sub-bands specific to the corresponding one of the UE groups based on the UE group interference relationship and a resource demand for each of the UE groups.

Figure 21A:
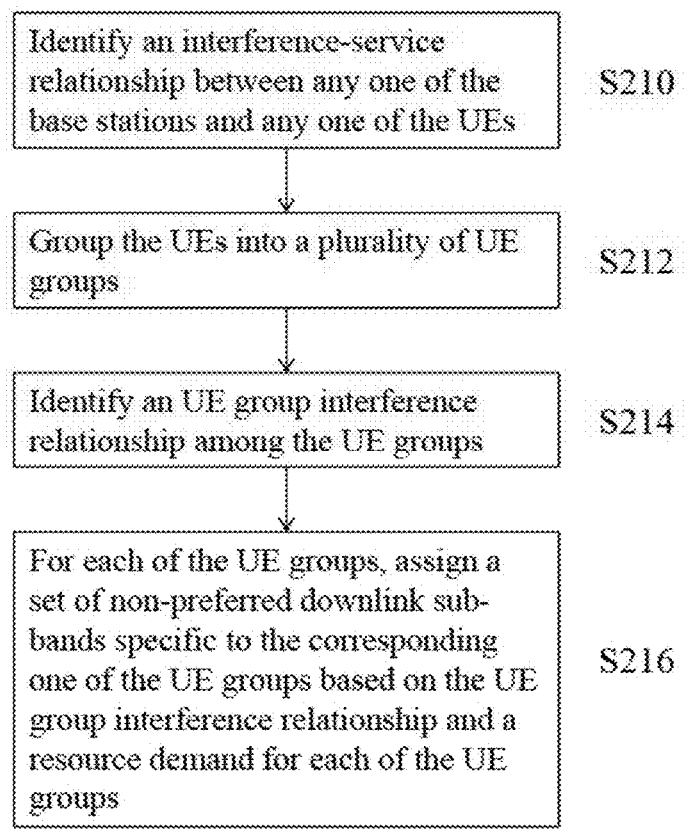
Figure 21C:
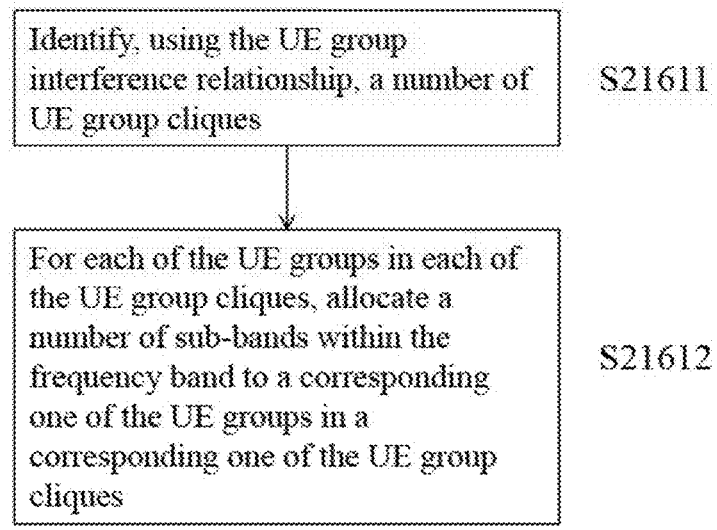

FIGS. 21A-21C illustrates methods of mitigating interference in a heterogeneous network using an inter-cell interference coordination in the frequency domain in accordance with several embodiments of the present application.

In particular, the interference control server identifies an interference-service relationship between any one of the base stations and any one of the UEs (Step S210), wherein the interference-service relationship indicates whether any one of the UEs is severed by or interfered from any one of the base stations.

The interference control server then groups the UEs into a plurality of UE groups (Step S212), wherein each UE in a same UE group has an identical interference-service relationship with all of the base stations.

The interference control server then identifies an UE group interference relationship among the UE groups (Step S214), wherein the UE group interference relationship indicates which ones of the UE groups would result in collision if simultaneously receiving downlink data in a same sub-band within a frequency band.

The interference control server then assigns, for each of the UE groups, a first set of frequency-specific sub-bands within the frequency band to a corresponding one of the UE groups as a set of non-preferred downlink sub-bands specific to the corresponding one of the UE groups based on the UE group interference relationship and a resource demand for each of the UE groups (Step S216).

In an embodiment, the resource demand for each of the UE groups is proportional to a number of the UEs in each of the UE groups, an estimated amount of occupied physical resource blocks (PRB) of all of the UEs in each of the UE groups, an estimated throughput of all of the UEs in each of the UE groups, or a channel quality between each of the UE groups and a corresponding one of the base stations.

In an embodiment, the interference control server assigns the set of non-preferred downlink sub-bands specific to the corresponding one of the UE groups (Step S216) by assigning, for each of the UE groups, a second set of frequency-specific sub-bands within the frequency band to the corresponding one of the UE groups as a set of preferred downlink sub-bands of the corresponding one of the UE groups based on the UE group interference relationship and the resource demand for each of the UE groups (Step S2161); and assigning, for each of the UE groups, a rest of the sub-bands within the frequency band that are not part of the set of preferred downlink sub-bands as the set of non-preferred downlink sub-bands of the corresponding one of the UE groups (Step S2162).

In an embodiment, the interference control server assigns the second set of frequency-specific sub-bands within the frequency band to the corresponding one of the UE groups as a set of preferred downlink sub-bands of the corresponding one of the UE groups (Step S2161) is performed by satisfying an assigning requirement that no two preferred downlink sub-bands assigned to the ones of the UE groups that may result in collision if simultaneously receiving downlink data in a same sub-band within the frequency band are the same.

In an embodiment, when a change of the resource demand for at least one of the UE groups is detected, the interference control server updates only the set of non-preferred downlink sub-bands of the at least one of the UE groups and the set of non-preferred downlink sub-bands of any one of the UE groups that may result in collision if simultaneously receiving downlink data in a same sub-band within the frequency band with the at least one of the UE groups based on a current resource demand for the at least one of the UE groups and the any one of the UE groups, without updating the set of non-preferred downlink sub-bands of the rest of the UE groups, by satisfying the assigning requirement.

In an embodiment, when the assigning requirement cannot be satisfied in the updating step, the interference control server updates the set of non-preferred downlink sub-bands of each of the UE groups by reassigning another set of frequency-specific sub-bands within the frequency band to a corresponding one of the UE groups as the non-preferred downlink sub-bands of the corresponding one of the UE groups based on the UE group interference relationship and the current resource demand for each of the UE groups and satisfying the assignment requirement.

In an embodiment, the resource demand for each of the UE groups is proportional to a number of the UEs in each of the UE groups, an estimated amount of occupied physical resource blocks (PRB) of all of the UEs in each of the UE groups, an estimated throughput of all of the UEs in each of the UE groups, or a channel quality between each of the UE groups and a corresponding one of the base stations.

In an embodiment, the interference control server assigns the second set of frequency specific sub-bands within the frequency band to the corresponding one of the UE groups as the set of preferred downlink sub-bands of the corresponding one of the UE groups comprises (Step S2161) by identifying, by using the UE group interference relationship, a number of UE group cliques, each of the UE group cliques consists of a maximum number of UE groups that may result in collision if simultaneously receiving downlink data in a same sub-band within the frequency band (Step S21611); and allocating, for each of the UE groups in each of the UE group cliques, a number of sub-bands within the frequency band to a corresponding one of the UE groups in a corresponding one of the UE group cliques substantially proportional to the resource demand for each of the UE groups in the corresponding one of the UE group cliques (Step S21612).

In an embodiment, the resource demand for each of the UE groups in the corresponding one of the UE group cliques is proportional to a number of the UEs in each of the UE groups in the corresponding one of the UE group cliques, an estimated amount of occupied physical resource blocks (PRB) of all of the UEs in each of the UE groups in the corresponding one of the UE group cliques, an estimated throughput of all of the UEs in each of the UE groups, or a channel quality between each of the UE groups and a corresponding one of the base stations in the corresponding one of the UE group cliques.

In an embodiment, when one UE group belongs to more than one of the UE group cliques, and the number of sub-bands allocated to the one UE group is not the same for each of the more than one of the UE group cliques, the interference control server allocates a smallest number of sub-bands to the one UE group as the number of sub-bands within the frequency band.

In an embodiment, the interference control server assigns, for each of the UE groups, each sub-band in the number of sub-bands within the frequency band with a specific number using a coloring algorithm, such that each of the sub-bands allocated to any of the UE groups in a corresponding one of the UE group cliques has a different specific number, wherein the specific number represent a frequency-specific sub-band within the frequency band.

In an embodiment, when an assigned specific number in a corresponding one of the UE groups corresponds to a frequency-specific sub-band that does not exist within the frequency band, and there is another one of the UE groups belonging to a same one of the UE group cliques as the corresponding one of the UE groups and the another one of the UE groups has a least UE group interference relationship with the rest of the UE groups, the interference control server switches the assigned specific number in the corresponding one of the UE groups with another specific number in the another one of the UE groups. After the switching, the interference control server unassigns the assigned specific number that corresponds to the frequency-specific sub-band that does not exist within the frequency band from the another one of the UE groups.

In an embodiment, when an assigned specific number in a corresponding one of the UE groups corresponds to a frequency-specific sub-band that does not exist within the frequency band, and none of the UE groups that belongs to a same one of the UE group cliques as the corresponding one of the UE groups has a less UE group interference relationship with the rest of the UE groups than the corresponding one of the UE groups does, the interference control server unassigns the assigned specific number that corresponds to the frequency-specific sub-band that does not exist within the frequency band from the corresponding one of the UE groups.

In an embodiment, the interference control server collects the interference-service information of each of the UEs from the base stations, and the interference-service information identifies the interference-service relationship based on the interference-service information of each of the UEs.

In view of the above, similar to the embodiments in the time domain applications, in the frequency domain applications, no two preferred downlink sub-bands assigned to the UE groups in the same UE group clique (which consists of a maximum number of UE groups that may result in collision if simultaneously receiving downlink data in a same sub-band within the frequency band) are the same. In other words, each of the UE groups in the same UE group clique has its own set of preferred downlink sub-bands that does not overlap with any of the preferred downlink sub-bands that are assigned to the other UE groups in the same UE group clique for downlink transmission. Therefore, no collision will occur among the UE groups in the same UE group clique, because the downlink transmission will be performed by the UE groups in the same UE group clique using the totally non-overlapping downlink sub-bands (i.e., preferred downlink sub-bands) in the frequency band. Accordingly, the collision among the UEs in the same UE group clique (and therefore the interference among the corresponding base stations) can be prevented, because the preferred downlink sub-bands for each of the UE groups in the same UE group clique (i.e., the UE groups that may result in collision) do not overlap with each other.

Accordingly, no UEs from different UE groups of the same UE group clique will perform downlink transmission in the same downlink sub-bands in a frequency band, which prevents any collision among the UE group in the same UE group clique and therefore prevents interference among the corresponding base stations.

Figure 22:
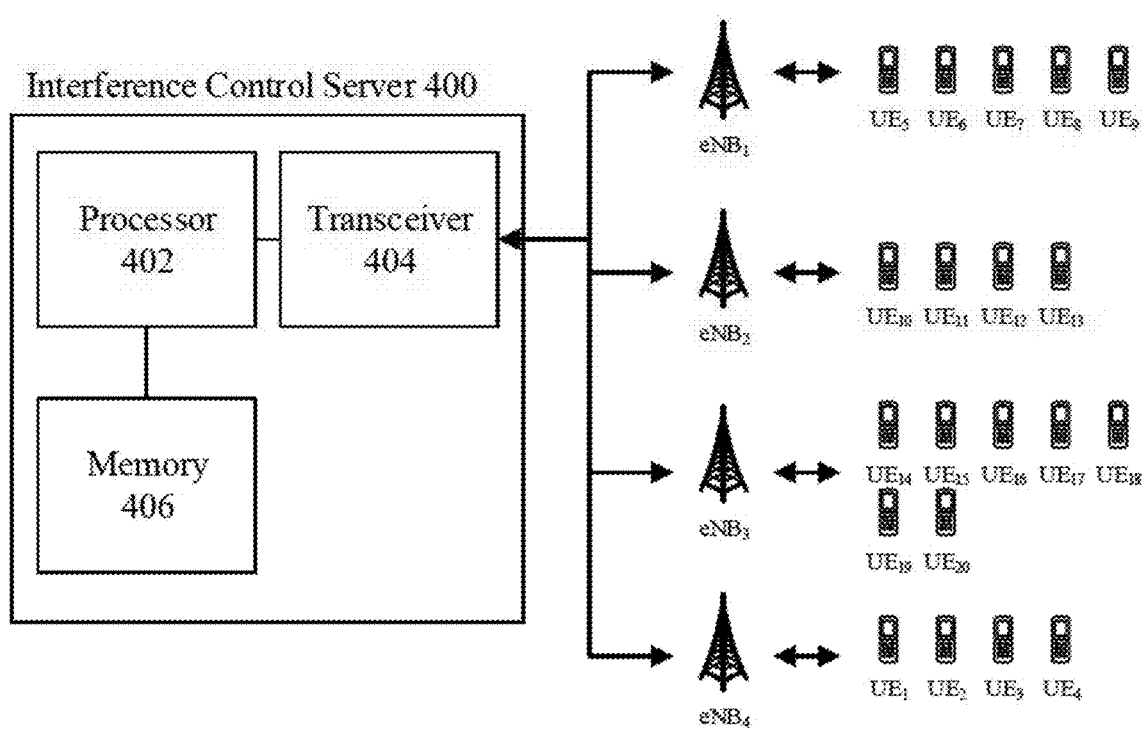
FIG. 22 illustrates a block diagram of an interference control server in a heterogeneous network for mitigating interference in the heterogeneous network using an inter-cell interference coordination in accordance with an embodiment of the present application.

FIG. 22 illustrates a block diagram of an interference control server in a heterogeneous network for mitigating interference in the heterogeneous network using an inter-cell interference coordination in accordance with an embodiment of the present application. As shown in FIG. 22, the interference control server 400 includes a transceiver 404 configured to receive interference-service information of each of the UEs from the base stations $eNB_1$-$eNB_4$. The interference control server 400 further includes a process 402 connected to a memory 406 and the transceiver 404, and configured to perform the processes mentioned in the above embodiments to mitigate interference in a heterogeneous network using an inter-cell interference coordination in the time domain and in the frequency domain.

Figure 23:
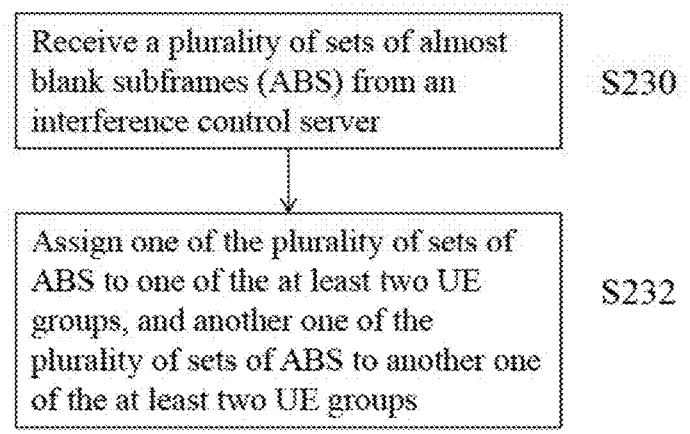
FIG. 23 illustrate methods of mitigating interference in a heterogeneous network using an inter-cell interference coordination in the time domain performed by the base station in the heterogeneous network in the time domain in accordance with several embodiment of the present application.

FIG. 23 illustrate methods of mitigating interference in a heterogeneous network using an inter-cell interference coordination in the time domain performed by the base station in the heterogeneous network in the time domain in accordance with several embodiment of the present application.

In particular, one of the base stations receives a plurality of sets of almost blank subframes (ABS) from an interference control server (Step S230), wherein each one of the plurality of sets of ABS is different from one another, at least two UE groups within the plurality of the UEs are currently served by the one of the base stations, and each of the at least two UE groups consists of a corresponding one or more UEs of the plurality of the UEs.

For example, using FIGS. 7, 15 and 22 for illustration purpose, the base station $eNB_1$ receives two (2) sets of almost blank subframes (ABS) from the transceiver 404 of the interference control server 400. As shown in FIG. 15, the first set of ABS is Resources #8-16, and the second set of ABS is Resources #1-13 and 16, which is different from the first set of ABS. In addition, two UE groups (i.e., the UE Groups 2 and 3) within the $UE_1$-$UE_{20}$ are currently served by base station $eNB_1$, and each of the UE Groups 2 and 3 consists of a corresponding one or more UEs (i.e., $UE_5$-$UE_8$ for the UE Group 2 and $UE_9$ for the UE Group 3).

The one of the base stations then assigns one of the plurality of sets of ABS to one of the at least two UE groups, and another one of the plurality of sets of ABS (that is different from one of the plurality of sets of ABS) to another one of the at least two UE groups (Step S232).

For example, using FIGS. 7, 15 and 22 for illustration purpose, the base station $eNB_1$ then assigns the first set of ABS to the UE Group 2, and assigns the second set of ABS to the UE Group 3.

In an embodiment, the one of the base stations assigns the plurality of sets of ABS by using an interference-service relationship between any one of the base stations and any one of the UEs, wherein the interference-service relationship (e.g., the interference-service relationship shown in FIGS. 6 and 7) indicates whether any one of the UEs is severed by or interfered from any one of the base stations.

In an embodiment, the one of the base stations assigns the one of the plurality of sets of ABS to the one UE group, wherein each UE in the one UE group has an identical interference-service relationship with all of the base stations, and assigns the another one of the plurality of sets of ABS to the another one UE group, wherein each UE in the another one UE group has an identical interference-service relationship with all of the base stations, wherein the identical interference-service relationship for the one UE group is different from the identical interference-service relationship for the another one UE group.

For example, as shown in FIGS. 6 and 7, each UE in the UE Group 2 has an identical interference-service relationship with all of the base stations eNB$_1$-eNB$_4$, each UE in the UE Group 3 has an identical interference-service relationship with all of the base stations eNB$_1$-eNB$_4$, and the identical interference-service relationship for the UE Group 2 is different from the identical interference-service relationship for the UE Group 3.

The above illustrated embodiments are directed to the time domain applications for a base station in the inter-cell interference coordination. However, the same concepts are also applicable to the frequency domain applications for a base station in the inter-cell interference coordination.

Figure 24:
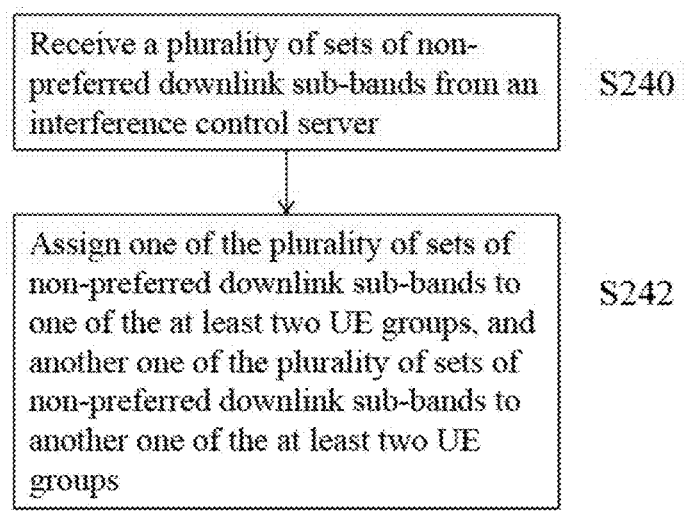
FIG. 24 illustrate methods of mitigating interference in a heterogeneous network using an inter-cell interference coordination in the time domain performed by the base station in the heterogeneous network in the frequency domain in accordance with several embodiment of the present application.

FIG. 24 illustrate methods of mitigating interference in a heterogeneous network using an inter-cell interference coordination in the time domain performed by the base station in the heterogeneous network in the frequency domain in accordance with several embodiment of the present application.

In particular, one of the base stations receives a plurality of sets of non-preferred downlink sub-bands from an interference control server (Step S240), wherein each one of the plurality of sets of non-preferred downlink sub-bands is different from one another, at least two UE groups within the plurality of the UEs are currently served by the one of the base stations, and each of the at least two UE groups consists of a corresponding one or more UEs of the plurality of the UEs.

For example, using FIGS. 7 and 22 for illustration purpose, the base station eNB$_1$ receives two (2) sets of non-preferred downlink sub-bands from the transceiver 404 of the interference control server 400. In addition, two UE groups (i.e., the UE Groups 2 and 3) within the UE$_1$-UE$_{20}$ are currently served by base station eNB$_1$, and each of the UE Groups 2 and 3 consists of a corresponding one or more UEs (i.e., UE$_5$-UE$_8$ for the US Group 2 and UE$_9$ for the UE Group 3).

The one of the base stations then assigns one of the plurality of sets of non-preferred downlink sub-bands to one of the at least two UE groups, and another one of the plurality of sets of non-preferred downlink sub-bands (that is different from one of the plurality of sets of non-preferred downlink sub-bands) to another one of the at least two UE groups (Step S242).

For example, using FIGS. 7 and 22 for illustration purpose, the base station eNB$_1$ then assigns the first set of non-preferred downlink sub-bands to the UE Group 2, and assigns the second set of non-preferred downlink sub-bands to the UE Group 3.

In an embodiment, the one of the base stations assigns the plurality of sets of non-preferred downlink sub-bands by using an interference-service relationship between any one of the base stations and any one of the UEs, wherein the interference-service relationship (e.g., the interference-service relationship shown in FIGS. 6 and 7) indicates whether any one of the UEs is severed by or interfered from any one of the base stations.

In an embodiment, the one of the base stations assigns the one of the plurality of sets of non-preferred downlink sub-bands to the one UE group, wherein each UE in the one UE group has an identical interference-service relationship with all of the base stations, and assigns the another one of the plurality of sets of non-preferred downlink sub-bands to the another one UE group, wherein each UE in the another one UE group has an identical interference-service relationship with all of the base stations, wherein the identical interference-service relationship for the one UE group is different from the identical interference-service relationship for the another one UE group.

For example, as shown in FIGS. 6 and 7, each UE in the UE Group 2 has an identical interference-service relationship with all of the base stations eNB$_1$-eNB$_4$, each UE in the UE Group 3 has an identical interference-service relationship with all of the base stations eNB$_1$-eNB$_4$, and the identical interference-service relationship for the UE Group 2 is different from the identical interference-service relationship for the UE Group 3.

In the above illustrated embodiments, since each of the UE groups in the same UE group clique has its own set of non-ABS (time domain applications) or own set of preferred downlink sub-bands (frequency domain applications) that does not overlap with any of the non-ABS or the preferred downlink sub-bands that are assigned to the other UE groups in the same UE group clique (which consists of a maximum number of UE groups that may result in collision if simultaneously receiving downlink data in a same downlink subframe within the period or in a same sub-band within the frequency band) for downlink transmission, no two non-ABS or two preferred downlink sub-bands assigned to the UE groups in the same UE group clique are the same. In other words, each of the UE groups in the same UE group clique has its own set of non-ABS or its own set of preferred downlink sub-bands that does not overlap with any of the preferred downlink sub-bands that are assigned to the other UE groups in the same UE group clique for downlink transmission. Therefore, no collision will occur among the UE groups in the same UE group clique, because the downlink transmission will be performed by the UE groups in the same UE group clique using the totally non-overlapping downlink subframes (i.e., non-ABS) or the totally non-overlapping downlink sub-bands (i.e., preferred downlink sub-bands) in the frequency band. Accordingly, the collision among the UEs in the same UE group clique (and therefore the interference among the corresponding base stations) can be prevented, because the non-ABS or the preferred downlink sub-bands for each of the UE groups in the same UE group clique (i.e., the UE groups that may result in collision) do not overlap with each other. Accordingly, no UEs from different UE groups of the same UE group clique will perform downlink transmission in the same non-ABS in a period or the same downlink sub-bands in a frequency band, which prevents any collision among the UE group in the same UE group clique and therefore prevents interference among the corresponding base stations.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of mitigating interference in a heterogeneous network using an inter-cell interference coordination, wherein the heterogeneous network comprises a plurality of base stations, communication ranges of at least some of the base stations overlap, and a plurality of user equipments (UEs) are within the communication ranges of the base stations, the method comprising:

identifying, by an interference control server, an interference-service relationship between any one of the base stations and any one of the UEs, wherein the interference-service relationship indicates whether any one of the UEs is severed by or interfered from any one of the base stations;

grouping, by the interference control server, the UEs into a plurality of UE groups, wherein each UE in a same UE group has an identical interference-service relationship with all of the base stations such that each UE in the same UE group that has the identical interference-service relationship with all of the base stations is served by a same one of the base stations, and is interfered from either none or a same one(s) of rest of the base stations;

identifying, by the interference control server, an UE group interference relationship among the UE groups, wherein the UE group interference relationship indicates which ones of the UE groups may result in collision if simultaneously receiving downlink data in a same downlink subframe within a period, the step of identifying comprises determining, for each of the plurality of UE groups, whether the respective UE group will collide with one or more of the rest of the plurality of UE groups when simultaneously receiving downlink data in the same downlink subframe within the period; and when it is determined that the respective UE group will collide with one or more of the rest of the plurality of UE groups when simultaneously receiving downlink data in the same downlink subframe within the period, identifying each interference relationship between said respective UE group and each of said one or more of the rest of the plurality of UE groups; and for each of the UE groups, assigning, by the interference control server, a first set of time-specific downlink subframes within the period to a corresponding one of the UE groups as a set of almost blank subframes (ABS) specific to the corresponding one of the UE groups based on the UE group interference relationship and a resource demand for each of the UE groups.

2. The method of claim 1, wherein the resource demand for each of the UE groups is proportional to a number of the UEs in each of the UE groups, an estimated amount of occupied physical resource blocks (PRB) of all of the UEs in each of the UE groups, an estimated throughput of all of the UEs in each of the UE groups, or a channel quality between each of the UE groups and a corresponding one of the base stations.

3. The method of claim 1, wherein the assigning step comprises:
for each of the UE groups, assigning, by the interference control server, a second set of time-specific downlink subframes within the period to the corresponding one of the UE groups as a set of non-ABS of the corresponding one of the UE groups based on the UE group interference relationship and the resource demand for each of the UE groups; and
for each of the UE groups, assigning, by the interference control server, a rest of the downlink subframes within the period that are not part of the set of non-ABS as the set of ABS of the corresponding one of the UE groups.

4. The method of claim 3, wherein the step of assigning the second set of time-specific downlink subframes within the period to the corresponding one of the UE groups as the set of non-ABS of the corresponding one of the UE groups is performed by satisfying an assigning requirement that no two non-ABS assigned to the ones of the UE groups that may result in collision if simultaneously receiving downlink data in a same downlink subframe within the period are the same.

5. The method of claim 4, further comprising:
when a change of the resource demand for at least one of the UE groups is detected, updating, by the interference control server, only the set of ABS of the at least one of the UE groups and the set of ABS of any one of the UE groups that may result in collision if simultaneously receiving downlink data in a same downlink subframe within the period with the at least one of the UE groups based on a current resource demand for the at least one of the UE groups and the any one of the UE groups, without updating the set of ABS of the rest of the UE groups, by satisfying the assigning requirement.

6. The method of claim 5, further comprising:
when the assigning requirement cannot be satisfied in the updating step, updating the set of ABS of each of the UE groups by reassigning, by the interference control server, another set of time-specific downlink subframes within the period to a corresponding one of the UE groups as the ABS of the corresponding one of the UE groups based on the UE group interference relationship and the current resource demand for each of the UE groups and satisfying the assignment requirement.

7. The method of claim 6, wherein the resource demand for each of the UE groups is proportional to a number of the UEs in each of the UE groups, an estimated amount of occupied physical resource blocks (PRB) of all of the UEs in each of the UE groups, an estimated throughput of all of the UEs in each of the UE groups, or a channel quality between each of the UE groups and a corresponding one of the base stations.

8. The method of claim 3, wherein the step of assigning the second set of time-specific downlink subframes within the period to the corresponding one of the UE groups as the set of non-ABS of the corresponding one of the UE groups comprises:
identifying, by the interference control server using the UE group interference relationship, a number of UE group cliques, each of the UE group cliques consists of a maximum number of UE groups that may result in collision if simultaneously receiving downlink data in a same downlink subframe within the period; and
for each of the UE groups in each of the UE group cliques, allocating, by the interference control server, a number of downlink subframes within the period to a corresponding one of the UE groups in a corresponding one of the UE group cliques substantially proportional to the resource demand for each of the UE groups in the corresponding one of the UE group cliques.

9. The method of claim 8, wherein the resource demand for each of the UE groups in the corresponding one of the UE group cliques is proportional to a number of the UEs in each of the UE groups in the corresponding one of the UE group cliques, an estimated amount of occupied physical resource blocks (PRB) of all of the UEs in each of the UE groups in the corresponding one of the UE group cliques, an estimated throughput of all of the UEs in each of the UE groups, or a channel quality between each of the UE groups and a corresponding one of the base stations in the corresponding one of the UE group cliques.

10. The method of claim 8, further comprising:
when one UE group belongs to more than one of the UE group cliques, and the number of downlink subframes allocated to the one UE group is not the same for each of the more than one of the UE group cliques, allocating, by the interference control server, a smallest number of downlink subframes to the one UE group as the number of downlink subframes within the period.

11. The method of claim 8, further comprising:
for each of the UE groups, assigning, by the interference control server, each downlink subframe in the number of downlink subframes within the period with a specific number using a coloring algorithm, such that each of the downlink subframes allocated to any of the UE groups in a corresponding one of the UE group cliques has a different specific number, wherein the specific number represent a time-specific downlink subframe within the period.

12. The method of claim 11, further comprising:
when an assigned specific number in a corresponding one of the UE groups corresponds to a time-specific downlink subframe that does not exist within the period, and there is another one of the UE groups belonging to a same one of the UE group cliques as the corresponding one of the UE groups and the another one of the UE groups has a least UE group interference relationship with the rest of the UE groups, switching, by the interference control server, the assigned specific number in the corresponding one of the UE groups with another specific number in the another one of the UE groups; and
after the switching step, unassigning, by the interference control server, the assigned specific number that corresponds to the time-specific downlink subframe that does not exist within the period from the another one of the UE groups.

13. The method of claim 11, further comprising:
when an assigned specific number in a corresponding one of the UE groups corresponds to a time-specific downlink subframe that does not exist within the period, and none of the UE groups that belongs to a same one of the UE group cliques as the corresponding one of the UE groups has a less UE group interference relationship with the rest of the UE groups than the corresponding one of the UE groups does, unassigning, by the interference control server, the assigned specific number that corresponds to the time-specific downlink subframe that does not exist within the period from the corresponding one of the UE groups.

14. The method of claim 1, further comprising:
collecting, by the interference control server, interference-service information of each of the UEs from the base stations,
wherein the step of identifying the interference-service relationship is performed based on the interference-service information of each of the UEs.

15. An interference control server for mitigating interference in a heterogeneous network using an inter-cell interference coordination, wherein the heterogeneous network comprises a plurality of base stations, communication ranges of at least some of the base stations overlap, and a plurality of user equipments (UEs) are within the communication ranges of the base stations, the interference control server comprising:
a receiver configured to receive interference-service information of each of the UEs from the base stations;
a processor connected to the receiver and configured to identify an interference-service relationship between any one of the base stations and any one of the UEs based on the interference-service information received by the receiver, wherein the interference-service relationship indicates whether any one of the UEs is severed by or interfered from any one of the base stations;
group the UEs into a plurality of UE groups, wherein each UE in a same UE group has an identical interference-service relationship with all of the base stations such that each UE in the same UE group that has the identical interference-service relationship with all of the base stations is served by a same one of the base stations, and is interfered from either none or a same one(s) of rest of the base stations;
identify an UE group interference relationship among the UE groups, wherein the UE group interference relationship indicates which ones of the UE groups may result in collision if simultaneously receiving downlink data in a same downlink subframe within a period, wherein the processor is configured to determine, for each of the plurality of UE groups, whether the respective UE group will collide with one or more of the rest of the plurality of UE groups when simultaneously receiving downlink data in the same downlink subframe within the period; and when it is determined that the respective UE group will collide with one or more of the rest of the plurality of UE groups when simultaneously receiving downlink data in the same downlink subframe within the period, the processor is configured to identify each interference relationship between said respective UE group and each of said one or more of the rest of the plurality of UE groups; and
for each of the UE groups, assign a first set of time-specific downlink subframes within the period to a corresponding one of the UE groups as a set of almost blank subframes (ABS) specific to the corresponding one of the UE groups based on the UE group interference relationship and a resource demand for each of the UE groups.

16. The interference control server of claim 15, wherein the resource demand for each of the UE groups is proportional to a number of the UEs in each of the UE groups, an estimated amount of occupied physical resource blocks (PRB) of all of the UEs in each of the UE groups, an estimated throughput of all of the UEs in each of the UE groups, or a channel quality between each of the UE groups and a corresponding one of the base stations.

17. The interference control server of claim 15, wherein when the processor assigns the first set of time-specific downlink subframes within the period for each of the UE groups, the processor is further configured to:
for each of the UE groups, assign a second set of time-specific downlink subframes within the period to the corresponding one of the UE groups as a set of non-ABS of the corresponding one of the UE groups based on the UE group interference relationship and the resource demand for each of the UE groups; and
for each of the UE groups, assign a rest of the downlink subframes within the period that are not part of the set of non-ABS as the set of ABS of the corresponding one of the UE groups.

18. The interference control server of claim 17, wherein the processor is configured to assign the second set of time-specific downlink subframes within the period to the corresponding one of the UE groups as the set of non-ABS of the corresponding one of the UE groups by satisfying an assigning requirement that no two non-ABS assigned to the ones of the UE groups that may result in collision if simultaneously receiving downlink data in a same downlink subframe within the period are the same.

19. The interference control server of claim 18, wherein the processor is further configured to:

when a change of the resource demand for at least one of the UE groups is detected, update only the set of ABS of the at least one of the UE groups and the set of ABS of any one of the UE groups that may result in collision if simultaneously receiving downlink data in a same downlink subframe within the period with the at least one of the UE groups based on a current resource demand for the at least one of the UE groups and the any one of the UE groups, without updating the set of ABS of the rest of the UE groups, by satisfying the assigning requirement.

20. The interference control server of claim 19, wherein the processor is further configured to:
when the assigning requirement cannot be satisfied in updating only the set of ABS of the at least one of the UE groups and the set of ABS of any one of the UE groups, update the set of ABS of each of the UE groups by reassigning another set of time-specific downlink subframes within the period to a corresponding one of the UE groups as the ABS of the corresponding one of the UE groups based on the UE group interference relationship and the current resource demand for each of the UE groups and satisfying the assignment requirement.

21. The interference control server of claim 20, wherein the resource demand for each of the UE groups is proportional to a number of the UEs in each of the UE groups, an estimated amount of occupied physical resource blocks (PRB) of all of the UEs in each of the UE groups, an estimated throughput of all of the UEs in each of the UE groups, or a channel quality between each of the UE groups and a corresponding one of the base stations.

22. The interference control server of claim 17, wherein when the processor assigns the second set of time-specific downlink subframes within the period to the corresponding one of the UE groups as the set of non-ABS of the corresponding one of the UE groups, the processor is further configured to:
identify, using the UE group interference relationship, a number of UE group cliques, each of the UE group cliques consists of a maximum number of UE groups that may result in collision if simultaneously receiving downlink data in a same downlink subframe within the period; and
for each of the UE groups in each of the UE group cliques, allocate a number of downlink subframes within the period to a corresponding one of the UE groups in a corresponding one of the UE group cliques substantially proportional to the resource demand for each of the UE groups in the corresponding one of the UE group cliques.

23. The interference control server of claim 22, wherein the resource demand for each of the UE groups in the corresponding one of the UE group cliques is proportional to a number of the UEs in each of the UE groups in the corresponding one of the UE group cliques, an estimated amount of occupied physical resource blocks (PRB) of all of the UEs in each of the UE groups in the corresponding one of the UE group cliques, an estimated throughput of all of the UEs in each of the UE groups, or a channel quality between each of the UE groups and a corresponding one of the base stations in the corresponding one of the UE group cliques.

24. The interference control server of claim 22, where the processor is further configured to:
when one UE group belongs to more than one of the UE group cliques, and the number of downlink subframes allocated to the one UE group is not the same for each of the more than one of the UE group cliques, allocate a smallest number of downlink subframes to the one UE group as the number of downlink subframes within the period.

25. The interference control server of claim 22, wherein the processor is further configured to:
for each of the UE groups, assign each downlink subframe in the number of downlink subframes within the period with a specific number using a coloring algorithm, such that each of the downlink subframes allocated to any of the UE groups in a corresponding one of the UE group cliques has a different specific number, wherein the specific number represent a time-specific downlink subframe within the period.

26. The interference control server of claim 25, wherein the processor is further configured to:
when an assigned specific number in a corresponding one of the UE groups corresponds to a time-specific downlink subframe that does not exist within the period, and there is another one of the UE groups belonging to a same one of the UE group cliques as the corresponding one of the UE groups and the another one of the UE groups has a least UE group interference relationship with the rest of the UE groups, switch the assigned specific number in the corresponding one of the UE groups with another specific number in the another one of the UE groups; and
after switching the assigned specific number in the corresponding one of the UE groups with another specific number in the another one of the UE groups, unassign the assigned specific number that corresponds to the time-specific downlink subframe that does not exist within the period from the another one of the UE groups.

27. The interference control server of claim 25, wherein the processor is further configured to:
when an assigned specific number in a corresponding one of the UE groups corresponds to a time-specific downlink subframe that does not exist within the period, and none of the UE groups that belongs to a same one of the UE group cliques as the corresponding one of the UE groups has a less UE group interference relationship with the rest of the UE groups than the corresponding one of the UE groups does, unassign the assigned specific number that corresponds to the time-specific downlink subframe that does not exist within the period from the corresponding one of the UE groups.

28. A method of mitigating interference in a heterogeneous network using an inter-cell interference coordination, wherein the heterogeneous network comprises a plurality of base stations, communication ranges of at least some of the base stations overlap, and a plurality of user equipments (UEs) are within the communication ranges of the base stations, the method comprising:
receiving, by one of the base stations, a plurality of sets of almost blank subframes (ABS) from an interference control server, wherein each one of the plurality of sets of ABS is different from one another, at least two UE groups within the plurality of the UEs are currently served by the one of the base stations, and each of the at least two UE groups consists of a corresponding one or more UEs of the plurality of the UEs; and
assigning, by the one of the base stations, one of the plurality of sets of ABS to one of the at least two UE groups, and another one of the plurality of sets of ABS to another one of the at least two UE groups, comprising the steps of: assigning, by the one of the base stations, the one of the plurality of sets of ABS to the one UE group, wherein each UE in the one UE group has an identical interference-service relationship with all of the base stations; and assigning, by the one of the base stations, the another one of the plurality of sets of ABS to the another one UE group, wherein each UE in the another one UE group has an identical interference-service relationship with all of the base stations, wherein the identical interference-service relationship for the one UE group is different from the identical interference-service relationship for the another one UE group.

29. The method of claim 28, wherein the assigned step is performed using an interference-service relationship between any one of the base stations and any one of the UEs, wherein the interference-service relationship indicates whether any one of the UEs is severed by or interfered from any one of the base stations such that each UE in the same UE group that has the identical interference-service relationship with all of the base stations is served by a same one of the base stations, and is interfered from either none or a same one(s) of rest of the base stations.

30. A method of mitigating interference in a heterogeneous network using an inter-cell interference coordination, wherein the heterogeneous network comprises a plurality of base stations, communication ranges of at least some of the base stations overlap, and a plurality of user equipments (UEs) are within the communication ranges of the base stations, the method comprising:

identifying, by an interference control server, an interference-service relationship between any one of the base stations and any one of the UEs, wherein the interference-service relationship indicates whether any one of the UEs is severed by or interfered from any one of the base stations;

grouping, by the interference control server, the UEs into a plurality of UE groups, wherein each UE in a same UE group has an identical interference-service relationship with all of the base stations such that each UE in the same UE group that has the identical interference-service relationship with all of the base stations is served by a same one of the base stations, and is interfered from either none or a same one(s) of rest of the base stations;

identifying, by the interference control server, an UE group interference relationship among the UE groups, wherein the UE group interference relationship indicates which ones of the UE groups would result in collision if simultaneously receiving downlink data in a same sub-band within a frequency band, the step of identifying comprises determining, for each of the plurality of UE groups, whether the respective UE group will collide with one or more of the rest of the plurality of UE groups when simultaneously receiving downlink data in the same sub-band within the frequency band; and when it is determined that the respective UE group will collide with one or more of the rest of the plurality of UE groups when simultaneously receiving downlink data in the same sub-band within the frequency band, identifying each interference relationship between said respective UE group and each of said one or more of the rest of the plurality of UE groups; and for each of the UE groups, assigning, by the interference control server, a first set of frequency-specific sub-bands within the frequency band to a corresponding one of the UE groups as a set of non-preferred downlink sub-bands specific to the corresponding one of the UE groups based on the UE group interference relationship and a resource demand for each of the UE groups.

* * * * *